United States Patent
Xu et al.

(10) Patent No.: US 11,228,405 B2
(45) Date of Patent: Jan. 18, 2022

(54) CONTROL CHANNEL PROCESSING LIMITS FOR ASYNCHRONOUS CELLS

(71) Applicant: QUALCOMM Incorporated, San Diego, CA (US)

(72) Inventors: Huilin Xu, San Diego, CA (US); Xiao Feng Wang, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 118 days.

(21) Appl. No.: 16/729,119

(22) Filed: Dec. 27, 2019

(65) Prior Publication Data

US 2020/0213047 A1 Jul. 2, 2020

Related U.S. Application Data

(60) Provisional application No. 62/787,667, filed on Jan. 2, 2019.

(51) Int. Cl.
*H04L 5/00* (2006.01)
*H04W 72/04* (2009.01)
(Continued)

(52) U.S. Cl.
CPC ............ *H04L 5/001* (2013.01); *H04L 1/0038* (2013.01); *H04L 5/0053* (2013.01);
(Continued)

(58) Field of Classification Search
CPC ..... H04L 1/0038; H04L 5/001; H04L 5/0053; H04L 27/26025; H04W 72/0406; H04W 72/0453
See application file for complete search history.

(56) References Cited

U.S. PATENT DOCUMENTS

| 2012/0307821 | A1* | 12/2012 | Kwon | ............... | H04W 76/27 |
| | | | | | 370/350 |
| 2020/0008076 | A1* | 1/2020 | Peng | ................. | H04W 72/04 |
| 2021/0119728 | A1* | 4/2021 | Nunome | ........... | H04W 72/1263 |

FOREIGN PATENT DOCUMENTS

| WO | WO-2017052833 A1 | 3/2017 |
| WO | WO-2018031327 A1 | 2/2018 |

(Continued)

OTHER PUBLICATIONS

International Search Report and Written Opinion—PCT/US2019/068918—ISA/EPO—dated Apr. 28, 2020.
(Continued)

*Primary Examiner* — Kevin C. Harper
(74) *Attorney, Agent, or Firm* — Holland & Hart LLP

(57) ABSTRACT

The described techniques provide for devices (e.g., a base station, a user equipment (UE)) to determine control channel processing limits for control channels for a CA configuration for a plurality of component carriers (CCs) with mixed numerology and synchronicities (e.g., CCs may have different transmission time interval (TTI) durations, subcarrier spacings, or frame timing). The devices may determine control channel processing limits for numerology groups or synchronization groups of the CA configuration based on a UE capability for processing control channels for a number of CCs, which may be allocated proportionally according to number of cells, allocated equally, or allocated using weighting factors assigned to synchronization or numerology groups. A base station may establish a CA configuration or control channel configuration according to the capability, or may ensure that a per-numerology restraint is not exceeded by determining a combined processing parameter.

30 Claims, 17 Drawing Sheets

(51) Int. Cl.
*H04L 1/00* (2006.01)
*H04L 27/26* (2006.01)

(52) U.S. Cl.
CPC ... *H04L 27/26025* (2021.01); *H04W 72/0406* (2013.01); *H04W 72/0453* (2013.01); *H04L 5/0048* (2013.01); *H04W 72/0413* (2013.01)

(56) References Cited

FOREIGN PATENT DOCUMENTS

| WO | WO-2018106043 A1 | 6/2018 |
| WO | WO-2019217738 A1 | 11/2019 |

OTHER PUBLICATIONS

Spreadtrum Communications: "Remaining issues on PDCCH", 3GPP Draft, R1-1808796, Remaining issues on PDCCH Final, 3rd Generation Partnership Project (3GPP), Mobile Competence Centre, 650, Route Des Lucioles, F-06921 Sophia-Antipolis Cedex, France, vol. RAN WG2, No. Gothenburg, Sweden, Aug. 20, 2018-Aug. 24, 2018, Aug. 10, 2018 (Aug. 10, 2018), XP051516169, 11 pages, Retrieved from the Internet: URL: http://www.3gpp.org/ftp/tsg%5Fran/WG1%5FRL1/TSGR1%5F94/Docs/R1%2D1808796%2Ezip. [retrieved on Aug. 10, 2018] Sections 2.2.1 and 2.2.2.

* cited by examiner

CONTROL CHANNEL PROCESSING LIMITS FOR ASYNCHRONOUS CELLS

CROSS REFERENCE

The present Application for Patent claims the benefit of U.S. Provisional Patent Application No. 62/787,667 by XU et al., entitled "CONTROL CHANNEL PROCESSING LIMITS FOR ASYNCHRONOUS CELLS," filed Jan. 2, 2019, assigned to the assignee hereof, and expressly incorporated by reference herein.

BACKGROUND

The following relates generally to wireless communications, and more specifically to control channel processing limits for asynchronous cells.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, a base station and UE may communicate via carrier aggregation (CA), where multiple component carriers (CCs) are configured for downlink and/or uplink transmissions. Each CC may be associated with one or more search space sets on one or more CCs (e.g., either self-scheduled on the same CC or cross-carrier scheduled on a different CC) that span one or more control channel elements (CCEs). The UE may thus attempt to blindly decode control signaling on the one or more CCEs to receive the downlink information or messages. The UE may combine signaling from one or more CCEs as part of the blind decoding in order to correctly piece together and receive the downlink messages. However, the number of CCEs to process and/or the number of blind decodes to perform may increase as the number of configured CCs increases, and in some cases may exceed the limits of a UE for processing (e.g., channel estimation or blind decoding). Efficient techniques are desired for counting and/or limiting the number of CCEs and blind decodes.

SUMMARY

The described techniques relate to improved methods, systems, devices, and apparatuses that support control channel element (CCE) and blind decode capabilities for carrier aggregation (CA) with mixed numerologies or asynchronous carriers. Generally, the described techniques provide for a user equipment (UE) to identify a CA configuration for a plurality of component carriers (CCs) with mixed numerology and synchronicities (e.g., CCs may have different transmission time interval (TTI) durations, subcarrier spacings, or frame timing). The UE may identify a maximum number of CCEs or blind decodes for one or more CCs of a CA configuration. Additionally, the UE may identify a maximum number of CCEs or blind decodes for one or more of the CCs per TTI. The UE may then obtain a maximum count of CCEs or blind decodes by summing the identified maximum numbers of CCEs or blind decodes and then comparing it to a CC or per slot limit for a particular CA configuration.

A method of wireless communication at a UE is described. The method may include identifying a capability of the UE associated with a number of component carriers (CCs) the UE supports for control channel decoding for carrier aggregation (CA), identifying a CA configuration including a set of CCs configured for communication for the UE, identifying one or more synchronization groups from the set of CCs, where CCs associated with each of the one or more synchronization groups are synchronous with each other, identifying one or more numerology groups from the set of CCs, where CCs associated with each of the one or more numerology groups share a same numerology with each other, determining a control channel processing limit for each CC of the set of CCs of the CA configuration based on the one or more synchronization groups, the one or more numerology groups, and the capability, and monitoring one or more control channels associated with the set of CCs according to the determined control channel processing limit for each CC of the set of CCs.

An apparatus for wireless communication at a UE is described. The apparatus may include a processor, memory coupled with the processor, and instructions stored in the memory. The instructions may be executable by the processor to cause the apparatus to identify a capability of the UE associated with a number of component carriers (CCs) the UE supports for control channel decoding for carrier aggregation (CA), identify a CA configuration including a set of CCs configured for communication for the UE, identify one or more synchronization groups from the set of CCs, where CCs associated with each of the one or more synchronization groups are synchronous with each other, identify one or more numerology groups from the set of CCs, where CCs associated with each of the one or more numerology groups share a same numerology with each other, determine a control channel processing limit for each CC of the set of CCs of the CA configuration based on the one or more synchronization groups, the one or more numerology groups, and the capability, and monitor one or more control channels associated with the set of CCs according to the determined control channel processing limit for each CC of the set of CCs.

Another apparatus for wireless communication at a UE is described. The apparatus may include means for identifying a capability of the UE associated with a number of component carriers (CCs) the UE supports for control channel decoding for carrier aggregation (CA), identifying a CA configuration including a set of CCs configured for communication for the UE, identifying one or more synchronization groups from the set of CCs, where CCs associated with each of the one or more synchronization groups are synchronous with each other, identifying one or more numerology groups from the set of CCs, where CCs associated with each of the one or more numerology groups share a same numerology with each other, determining a control channel processing limit for each CC of the set of CCs of the CA configuration based on the one or more synchronization groups, the one or more numerology groups, and the capability, and monitoring one or more control channels associated with the set of CCs according to the determined control channel processing limit for each CC of the set of CCs.

A non-transitory computer-readable medium storing code for wireless communication at a UE is described. The code may include instructions executable by a processor to identify a capability of the UE associated with a number of component carriers (CCs) the UE supports for control channel decoding for carrier aggregation (CA), identify a CA configuration including a set of CCs configured for communication for the UE, identify one or more synchronization groups from the set of CCs, where CCs associated with each of the one or more synchronization groups are synchronous with each other, identify one or more numerology groups from the set of CCs, where CCs associated with each of the one or more numerology groups share a same numerology with each other, determine a control channel processing limit for each CC of the set of CCs of the CA configuration based on the one or more synchronization groups, the one or more numerology groups, and the capability, and monitor one or more control channels associated with the set of CCs according to the determined control channel processing limit for each CC of the set of CCs.

In some examples of the method, apparatuses, and non-transitory computer-readable medium described herein, determining the control channel processing limit for each CC may include operations, features, means, or instructions for allocating respective portions of the capability to each synchronization group of the one or more synchronization groups.

In some examples of the method, apparatuses, and non-transitory computer-readable medium described herein, the respective portions of the capability for each synchronization group may be allocated based on a proportion of a number of downlink CCs of each synchronization group to a total number of downlink CCs of the CA configuration.

In some examples of the method, apparatuses, and non-transitory computer-readable medium described herein, the respective portions of the capability may be allocated equally between each synchronization group.

In some examples of the method, apparatuses, and non-transitory computer-readable medium described herein, the respective portions of the capability may be allocated based on respective weighting factors for each synchronization group.

In some examples of the method, apparatuses, and non-transitory computer-readable medium described herein, allocating respective portions of the capability to each synchronization group of the one or more synchronization groups may include operations, features, means, or instructions for allocating a portion of the capability to a synchronization group containing a primary cell or a primary secondary cell, and allocating a remaining portion of the capability to the one or more synchronization groups.

In some examples of the method, apparatuses, and non-transitory computer-readable medium described herein, determining the control channel processing limit for each CC further may include operations, features, means, or instructions for distributing the respective portions of the capability among numerology groups within each of the one or more synchronization groups based on respective numbers of downlink CCs of the one or more numerology groups within each of the one or more synchronization groups.

In some examples of the method, apparatuses, and non-transitory computer-readable medium described herein, determining the control channel processing limit for each CC may include operations, features, means, or instructions for allocating respective portions of the capability to each numerology group of the one or more numerology groups.

In some examples of the method, apparatuses, and non-transitory computer-readable medium described herein, determining the control channel processing limit for each CC further may include operations, features, means, or instructions for distributing the respective portions of the capability among synchronization groups within each of the one or more numerology groups based on respective numbers of downlink CCs of the one or more synchronization groups within each of the one or more numerology groups.

In some examples of the method, apparatuses, and non-transitory computer-readable medium described herein, the control channel processing limit includes a maximum number of blind decodes or control channel elements processed by the UE per slot.

In some examples of the method, apparatuses, and non-transitory computer-readable medium described herein, each of the one or more synchronization groups corresponds to one of a set of uplink control channel groups.

In some examples of the method, apparatuses, and non-transitory computer-readable medium described herein, the set of CCs includes a first CC that may be scheduled by a second CC that may be asynchronous to the first CC, and where the first CC may be included in a synchronization group associated with the second CC.

A method of wireless communication at a base station is described. The method may include transmitting, to a UE, a carrier aggregation (CA) configuration including a set of component carriers (CCs) configured for communication with the UE, identifying a control channel processing limit for each CC of the set of CCs of the CA configuration based on one or more synchronization groups from the set of CCs, one or more numerology groups from the set of CCs, and a capability of the UE associated with a number of CCs the UE supports for control channel decoding for CA, where CCs associated with each of the one or more synchronization groups are synchronous with each other, and where CCs associated with each of the one or more numerology groups share a same numerology with each other, and transmitting one or more control channels associated with the set of CCs in accordance with the control channel processing limit for each CC of the set of CCs.

An apparatus for wireless communication at a base station is described. The apparatus may include a processor, memory coupled with the processor, and instructions stored in the memory. The instructions may be executable by the processor to cause the apparatus to transmit, to a UE, a carrier aggregation (CA) configuration including a set of component carriers (CCs) configured for communication with the UE, identify a control channel processing limit for each CC of the set of CCs of the CA configuration based on one or more synchronization groups from the set of CCs, one or more numerology groups from the set of CCs, and a capability of the UE associated with a number of CCs the UE supports for control channel decoding for CA, where CCs associated with each of the one or more synchronization groups are synchronous with each other, and where CCs associated with each of the one or more numerology groups share a same numerology with each other, and transmit one or more control channels associated with the set of CCs in accordance with the control channel processing limit for each CC of the set of CCs.

Another apparatus for wireless communication at a base station is described. The apparatus may include means for transmitting, to a UE, a carrier aggregation (CA) configuration including a set of component carriers (CCs) configured for communication with the UE, identifying a control channel processing limit for each CC of the set of CCs of the CA configuration based on one or more synchronization groups from the set of CCs, one or more numerology groups from the set of CCs, and a capability of the UE associated with a number of CCs the UE supports for control channel decoding for CA, where CCs associated with each of the one or more synchronization groups are synchronous with each other, and where CCs associated with each of the one or more numerology groups share a same numerology with each other, and transmitting one or more control channels associated with the set of CCs in accordance with the control channel processing limit for each CC of the set of CCs.

A non-transitory computer-readable medium storing code for wireless communication at a base station is described. The code may include instructions executable by a processor to transmit, to a UE, a carrier aggregation (CA) configuration including a set of component carriers (CCs) configured for communication with the UE, identify a control channel processing limit for each CC of the set of CCs of the CA configuration based on one or more synchronization groups from the set of CCs, one or more numerology groups from the set of CCs, and a capability of the UE associated with a number of CCs the UE supports for control channel decoding for CA, where CCs associated with each of the one or more synchronization groups are synchronous with each other, and where CCs associated with each of the one or more numerology groups share a same numerology with each other, and transmit one or more control channels associated with the set of CCs in accordance with the control channel processing limit for each CC of the set of CCs.

In some examples of the method, apparatuses, and non-transitory computer-readable medium described herein, identifying the control channel processing limit for each CC may include operations, features, means, or instructions for allocating respective portions of the capability to each synchronization group of the one or more synchronization groups.

In some examples of the method, apparatuses, and non-transitory computer-readable medium described herein, the respective portions of the capability for each synchronization group may be allocated based on a proportion of a number of downlink CCs of each synchronization group to a total number of downlink CCs of the CA configuration.

In some examples of the method, apparatuses, and non-transitory computer-readable medium described herein, the respective portions of the capability may be allocated equally between synchronization group.

In some examples of the method, apparatuses, and non-transitory computer-readable medium described herein, the respective portions of the capability may be allocated based on respective weighting factors for each synchronization group.

In some examples of the method, apparatuses, and non-transitory computer-readable medium described herein, a portion of the capability may be allocated to a synchronization group containing a primary cell or a primary secondary cell, and where a remaining portion of the capability may be allocated to the one or more synchronization groups.

In some examples of the method, apparatuses, and non-transitory computer-readable medium described herein, the respective portions of the capability may be distributed among numerology groups within each of the one or more synchronization groups based on respective numbers of downlink CCs of the one or more numerology groups within each of the one or more synchronization groups.

In some examples of the method, apparatuses, and non-transitory computer-readable medium described herein, each numerology group of the one or more numerology groups may be allocated respective portions of the capability.

In some examples of the method, apparatuses, and non-transitory computer-readable medium described herein, the respective portions of the capability may be distributed among synchronization groups within each of the one or more numerology groups based on respective numbers of downlink CCs of the one or more synchronization groups within each of the one or more numerology groups.

In some examples of the method, apparatuses, and non-transitory computer-readable medium described herein, the control channel processing limit includes a maximum number of blind decodes or control channel elements processed by the UE per slot.

In some examples of the method, apparatuses, and non-transitory computer-readable medium described herein, each of the one or more synchronization groups corresponds to one of a set of uplink control channel groups.

In some examples of the method, apparatuses, and non-transitory computer-readable medium described herein, the set of CCs includes a first CC that may be scheduled by a second CC that may be asynchronous to the first CC, and where the first CC and may be included in a synchronization group associated with the second CC.

A method of wireless communication at a base station is described. The method may include identifying a carrier aggregation (CA) configuration including a set of component carriers (CCs) configured for communication with a UE, identifying one or more numerology groups from the set of CCs, where CCs associated with each of the one or more numerology groups share a same numerology with each other, determining a control channel processing limit for each of the one or more numerology groups based on a capability of the UE associated with a number of CCs the UE supports for control channel decoding for CA, identifying one or more synchronization groups for each of the one or more numerology groups, where CCs associated with each of the one or more synchronization groups are synchronous and share a same numerology with each other, and establishing a control channel configuration for the UE for a set of slots based on comparing a combined value for a control channel processing parameter for the one or more synchronization groups of each of the one or more numerology groups across the set of slots to the respective control channel processing limit of the each of the one or more numerology groups.

An apparatus for wireless communication at a base station is described. The apparatus may include a processor, memory coupled with the processor, and instructions stored in the memory. The instructions may be executable by the processor to cause the apparatus to identify a carrier aggregation (CA) configuration including a set of component carriers (CCs) configured for communication with a UE, identify one or more numerology groups from the set of CCs, where CCs associated with each of the one or more numerology groups share a same numerology with each other, determine a control channel processing limit for each of the one or more numerology groups based on a capability of the UE associated with a number of CCs the UE supports for control channel decoding for CA, identify one or more synchronization groups for each of the one or more numerology groups, where CCs associated with each of the one or more synchronization groups are synchronous and share a same numerology with each other, and establish a control channel configuration for the UE for a set of slots based on comparing a combined value for a control channel processing parameter for the one or more synchronization groups of each of the one or more numerology groups across the set of slots to the respective control channel processing limit of the each of the one or more numerology groups.

Another apparatus for wireless communication at a base station is described. The apparatus may include means for identifying a carrier aggregation (CA) configuration including a set of component carriers (CCs) configured for communication with a UE, identifying one or more numerology groups from the set of CCs, where CCs associated with each of the one or more numerology groups share a same numerology with each other, determining a control channel processing limit for each of the one or more numerology groups based on a capability of the UE associated with a number of CCs the UE supports for control channel decoding for CA, identifying one or more synchronization groups for each of the one or more numerology groups, where CCs associated with each of the one or more synchronization groups are synchronous and share a same numerology with each other, and establishing a control channel configuration for the UE for a set of slots based on comparing a combined value for a control channel processing parameter for the one or more synchronization groups of each of the one or more numerology groups across the set of slots to the respective control channel processing limit of the each of the one or more numerology groups.

A non-transitory computer-readable medium storing code for wireless communication at a base station is described. The code may include instructions executable by a processor to identify a carrier aggregation (CA) configuration including a set of component carriers (CCs) configured for communication with a UE, identify one or more numerology groups from the set of CCs, where CCs associated with each of the one or more numerology groups share a same numerology with each other, determine a control channel processing limit for each of the one or more numerology groups based on a capability of the UE associated with a number of CCs the UE supports for control channel decoding for CA, identify one or more synchronization groups for each of the one or more numerology groups, where CCs associated with each of the one or more synchronization groups are synchronous and share a same numerology with each other, and establish a control channel configuration for the UE for a set of slots based on comparing a combined value for a control channel processing parameter for the one or more synchronization groups of each of the one or more numerology groups across the set of slots to the respective control channel processing limit of the each of the one or more numerology groups.

Some examples of the method, apparatuses, and non-transitory computer-readable medium described herein may further include operations, features, means, or instructions for determining that the combined value for the control channel processing parameter for a numerology group of the one or more numerology groups exceeds the respective control channel processing limit, modifying the CA configuration or the control channel configuration in accordance with the respective control channel processing limit, and transmitting the modified CA configuration or the modified control channel configuration to the UE.

Some examples of the method, apparatuses, and non-transitory computer-readable medium described herein may further include operations, features, means, or instructions for determining the combined value for the control channel processing parameter for each of the one or more numerology groups based on summing a largest value of the control channel processing parameter across the set of slots for each of the one or more synchronization groups of the each of the one or more numerology groups.

Some examples of the method, apparatuses, and non-transitory computer-readable medium described herein may further include operations, features, means, or instructions for determining the combined value for a numerology group including a primary cell for each slot of the set of slots by summing a value for the control channel processing parameter for the primary cell for the each slot with a largest value of the control channel processing parameter across the set of slots for each of the one or more synchronization groups of the numerology group.

Some examples of the method, apparatuses, and non-transitory computer-readable medium described herein may further include operations, features, means, or instructions for determining the combined value for the control channel processing parameter for each of the one or more numerology groups based on summing a largest number for the control channel processing parameter for each CC of the each of the one or more numerology groups across the set of slots.

Some examples of the method, apparatuses, and non-transitory computer-readable medium described herein may further include operations, features, means, or instructions for determining the combined value for a numerology group including a primary cell for each slot of the set of slots by summing a value for the control channel processing parameter for the primary cell for the each slot with a largest number for the control channel processing parameter for other CCs of the each of the one or more numerology groups across the set of slots.

Some examples of the method, apparatuses, and non-transitory computer-readable medium described herein may further include operations, features, means, or instructions for determining the combined value for the control channel processing parameter for each of the one or more numerology groups based on summing, for each slot of the set of slots, a value for the control channel processing parameter for a reference synchronization group of the each of the one or more numerology groups with a largest value of the control channel processing parameter for each other of the one or more synchronization groups of the each of the one or more numerology groups within a range of slots of the each slot.

In some examples of the method, apparatuses, and non-transitory computer-readable medium described herein, the reference synchronization group includes a primary cell for the UE.

In some examples of the method, apparatuses, and non-transitory computer-readable medium described herein, the control channel processing parameter includes blind decodes or control channel elements processed by the UE per slot.

DETAILED DESCRIPTION

Figure 1:
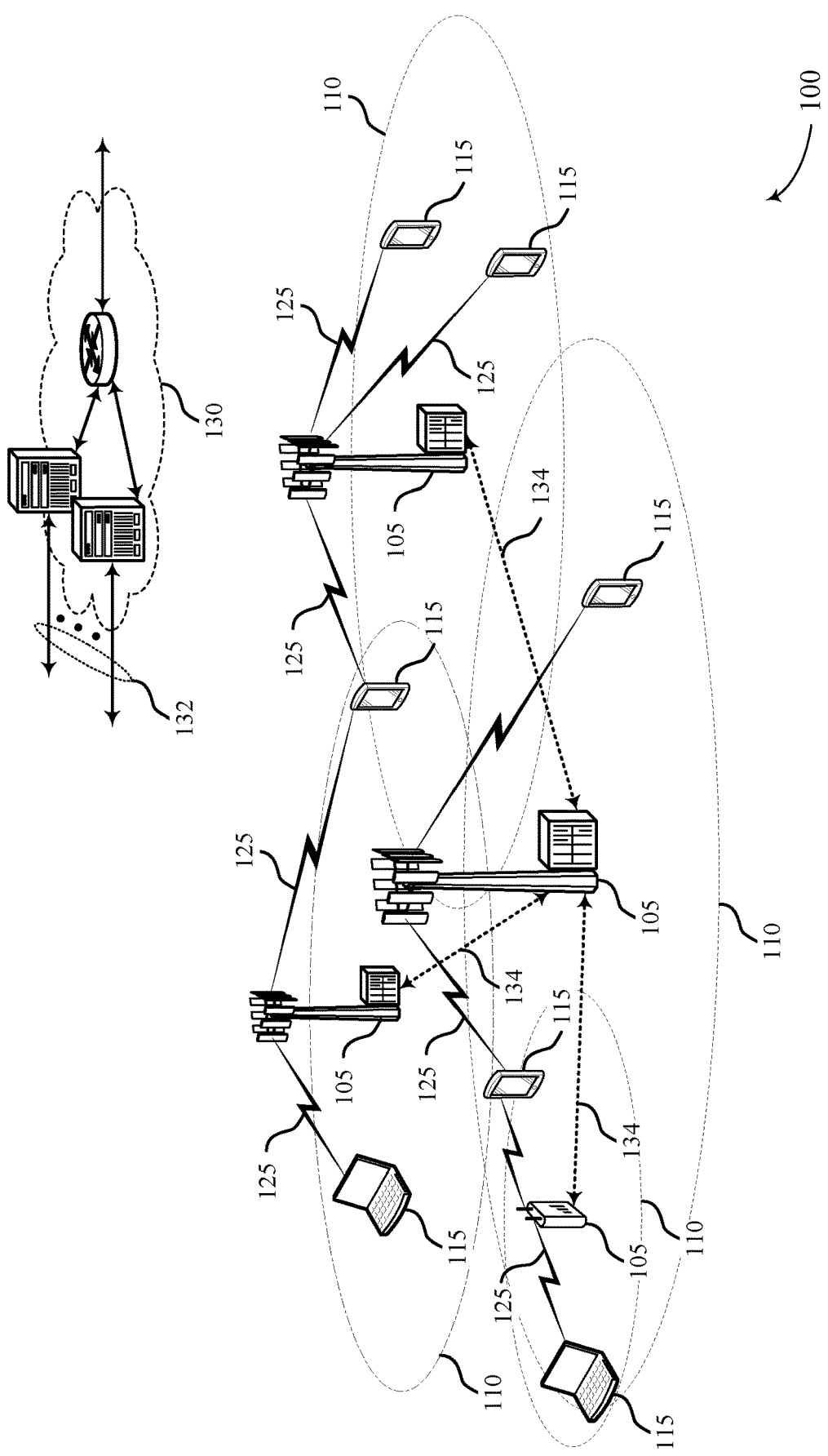
FIG. 1 illustrates an example of a system for wireless communications that supports control channel processing for asynchronous cells in accordance with aspects of the present disclosure.

A base station and user equipment (UE) may utilize carrier aggregation (CA) in some wireless communications systems to provide more efficient and robust communications by transmitting downlink and/or uplink messages on one or more component carriers (CCs). For example, the base station may configure the UE with multiple CCs and may transmit multiple downlink transmissions to the UE or receive multiple uplink transmissions concurrently over one or more of the multiple CCs. Each CC may be associated with one or more search space sets on one or more CCs (e.g., either self-scheduled on the same CC or cross-carrier scheduled on a different CC) that span one or more control channel elements (CCEs). The UE may thus attempt to blindly decode control signaling (e.g., physical downlink control channel (PDCCH), etc.) on the one or more CCEs to receive the downlink control (DCI) (e.g., including grants for the one or more CCs). The search space sets may include DCI at multiple aggregation levels, which may be nested within the one or more CCEs. However, the number of CCEs to process and/or the number of blind decodes to perform may increase as the number of configured CCs increases, and in some cases may exceed the limits of a UE for processing (e.g., channel estimation or blind decoding).

In a CA system, the maximum number of blind decodes or CCEs per slot that the UE supports may be constrained. In some instances, a UE capability may include the number of CCs the UE may support for control channel decoding for CA. That is, the UE may have a per-CC limit, and may support up to the per-CC limit for each of a number of CCs up to the capability. In some cases, a base station may configure more CCs than the UE capability. If a number of CCs of a CA configuration is greater than a capability of a UE, then a limit of blind decodes and CCEs may be based on the capability. This limit may be split across sets of CCs with different numerologies and between different CCs of a set of CCs. The numerology may correspond, for example, to a subcarrier spacing and symbol period duration of resources of the CC. In some cases, the blind decoding and CCE limits may be based on the numerology, where each CC has its own single-carrier blind decoding/CCE limit per transmission time interval (TTI) or slot. For example, the limits for the number of blind decodes or the number of CCEs may be 44, 36, 22, and 20 per CC for 15 kHz, 30 kHz, 60 kHz, and 120 kHz subcarrier spacings of the CC, respectively. Additionally, the duration of the TTIs in each CC may be based on the subcarrier spacing for the CC, where the subcarrier spacing is determined from the numerology for the CC. For CCs with the same numerology (e.g., subcarrier spacing), each CC may have the same TTI duration.

However, different CCs of a CA configuration for a UE may have different numerologies (e.g., in a mixed numerology system) and accordingly, different subcarrier spacings and TTI durations. Additionally or alternatively, the TTI timings may not be aligned, and some CCs of the CA configuration may be asynchronous with each other. The varying numerologies among CCs may in turn affect the number of blind decodes and CCEs that a UE may have to process for a particular CC. Accordingly, wireless systems may include procedures for determining a maximum number of blind decodes and CCEs for one or more CCs for a CA configuration and apportioning a limit for each of the CCs of the CA configuration. Control channel configurations for a UE may then be established based on the apportioned limits. As explained herein, some benefits of this technique may include preventing a control channel configuration exceeding a per CC limit for a UE processing blind decodes and/or CCEs (i.e., overbooking).

Aspects of the disclosure are initially described in the context of a wireless communications system. An additional wireless communications system, diagrams of capability groupings, and process flow are then provided to describe further aspects of the present disclosure. Aspects of the disclosure are further illustrated by and described with reference to apparatus diagrams, system diagrams, and flowcharts that relate to control channel processing for asynchronous cells.

FIG. 1 illustrates an example of a wireless communications system 100 that supports control channel processing for asynchronous cells in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A physical downlink control channel (PDCCH) carries downlink control information (DCI) in at least one control channel element (CCE), which may comprise of nine logically contiguous resource element groups (REGs), where each REG contains 4 resource elements. DCI includes information regarding downlink (DL) scheduling assignments, UL resource grants, transmission schemes, uplink (UL) power control, hybrid automatic repeat request (HARQ) information, modulation coding scheme (MCS) and other information. The size and format of the DCI messages can differ depending on the type and amount of information that is carried by the DCI. For example, if spatial multiplexing is supported, the size of the DCI message is large compared to contiguous frequency allocations. Similarly, for a system that employs multi-input multi-output (MIMO), the DCI may include additional signaling information. DCI size and format depend on the amount of information as well as factors such as bandwidth, the number of antenna ports, and duplexing mode.

PDCCH may carry DCI messages associated with multiple users, and each UE 115 may decode the DCI messages that are intended for it. For example, each UE 115 may be assigned a cell radio network temporary identifier (C-RNTI) and cyclic redundancy check (CRC) bits attached to each DCI may be scrambled based on the C-RNTI. To reduce power consumption and overhead at the user equipment, a limited set of CCE locations may be specified for DCI associated with a specific UE 115. CCEs may be grouped (e.g., in groups of 1, 2, 4 and 8 CCEs), and a set of CCE locations in which the user equipment may find relevant DCI may be specified. These CCEs may be known as a search space or search space set. Search space sets may be common (e.g., carrying DCI for a group of UEs) or UE-specific. CCEs in a common search space set are monitored by a group or all UEs served by a base station 105 and may include information such as paging information, system information, random access procedures and the like. A UE-specific search space set may include user-specific control information. CCEs may be indexed, and the common search space may start from CCE 0. The starting index for a UE specific search space may depend on the C-RNTI, the subframe index, the CCE aggregation level or a random seed. A UE 115 may attempt to decode DCI by performing a process known as blind decoding, during which PDCCH candidates of a search space set are decoded and checked using an error checking function and an RNTI (e.g., common RNTI, C-RNTI) until the DCI is detected.

Wireless communications system 100 may support CCE and blind decode capabilities for mixed numerology CA. Generally, the described techniques provide for a UE 115 to identify a CA configuration for a plurality of CCs with mixed numerology and synchronicities (e.g., CCs having different TTI durations, subcarrier spacings, or frame timing). UE 115 may identify a maximum number of CCEs or blind decodes for one or more CCs of a CA configuration. Additionally, UE 115 may identify a maximum number of CCEs or blind decodes for one or more of the CCs per TTI. UE 115 may then obtain a maximum count of CCEs or blind decodes by summing the identified maximum numbers of CCEs or blind decodes and then comparing it to a CC or per slot limit for a particular CA configuration.

Figure 2:
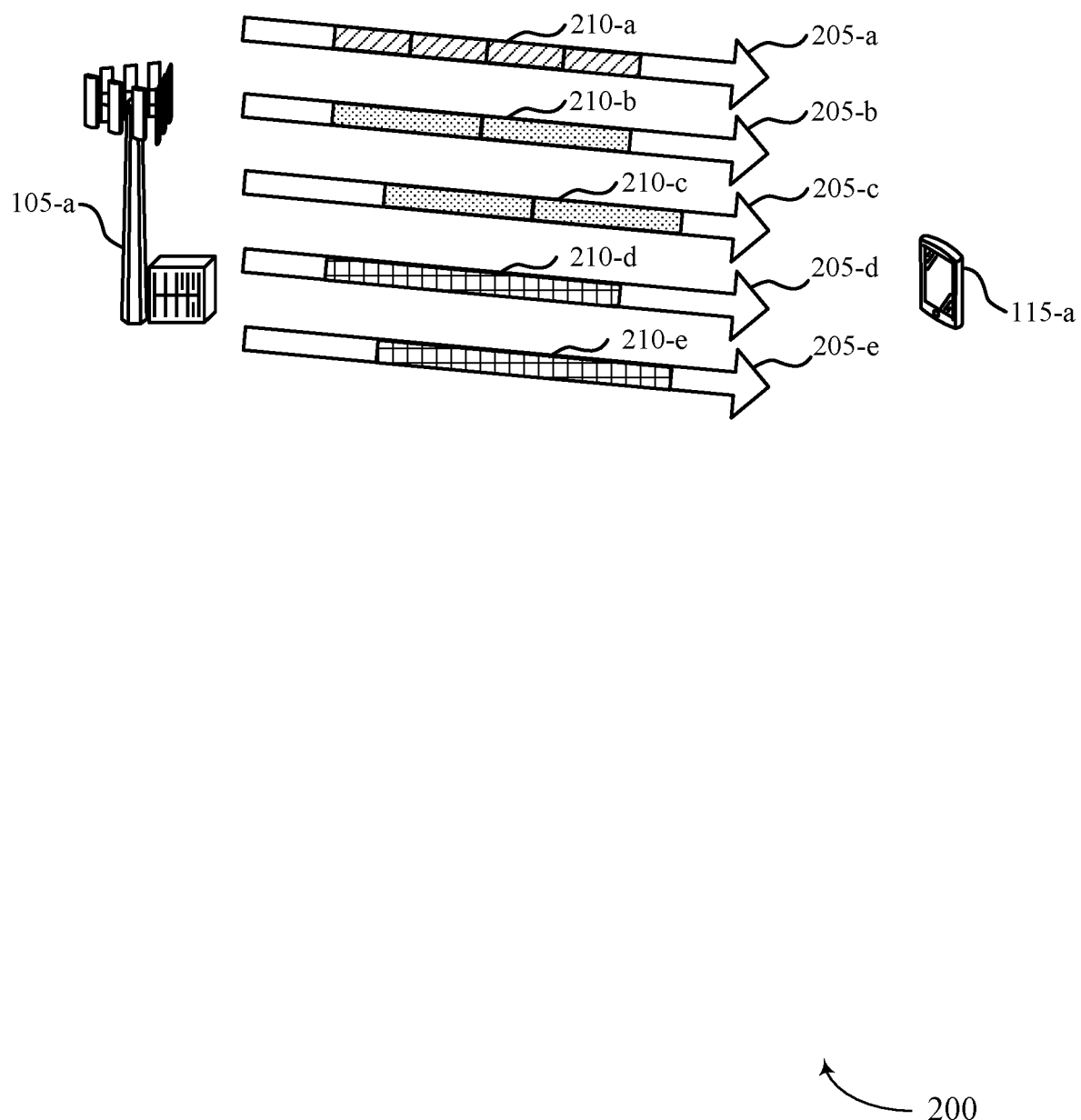
FIG. 2 illustrates an example of a wireless communications system that supports control channel processing for asynchronous cells in accordance with aspects of the present disclosure.

FIG. 2 illustrates an example of a wireless communications system 200 that supports control channel processing for asynchronous cells in accordance with aspects of the present disclosure. In some examples, wireless communications system 200 may implement aspects of wireless communication system 100. Wireless communications system 200 may include a base station 105-a and a UE 115-a, which may be examples of corresponding base stations 105 and UEs 115 as described with reference to FIG. 1.

Base station 105-a and UE 115-a may communicate using CA, where UE 115-a is configured with multiple CCs 205, some or all of which may be downlink CCs. Configured downlink CCs may be activated or deactivated, where a control channel may be monitored for an activated cell, and may not be monitored for a deactivated cell. In some cases, CCs 205 may have mixed numerology configurations, where at least two of CCs 205 have different subcarrier spacings. For example, CC 205-a may have a first subcarrier spacing (e.g., 60 kHz) corresponding to a first TTI 210-a (e.g., first slot duration), CCs 205-b and 205-c may have a second subcarrier spacing (e.g., 30 kHz) corresponding to a second TTI 210-b or 210-c (e.g., second slot duration longer than the first slot duration), and CCs 205-d and 205-e may have a third subcarrier spacing (e.g., 15 kHz) corresponding to a third TTI 210-d or 210-e (e.g., third slot duration longer than both the first slot duration and the second slot duration). The subcarrier spacing for each CC 205 may be determined by, for example, an active downlink bandwidth part (BWP) for the CC 205 if the CC 205 is an activated cell, or the first BWP to be activated (e.g., defined by a configured index) if the CC 205 corresponds to a deactivated cell. In some cases, TTIs 205-b may be asynchronous (e.g., are not time-aligned) with TTIs 205-c, and TTIs 205-d may be asynchronous (e.g., are not time-aligned) with TTIs 205-e. In some cases, UE 115-a may perform blind decoding on CCs 205 corresponding to activated cells to receive control information that schedules downlink transmissions from base station 105-a via CCs 205.

In a first set of examples, control channel processing limits may be applied per-synchronization group and per-numerology group. That is, UE 115-a may determine a limit of blind decodes and/or a number of CCEs to process (i.e., a control channel processing limit) for a group of CCs that have the same numerology and timing. UE 115-a may monitor a control channel according to the control channel processing limit. Although not monitored, the control channel processing limits may be applied across deactivated cells, such that the processing limits per-synchronization group and per-numerology group may not change based on cell activation or deactivation.

In some cases, determining a control channel processing limit for CCs 205 may occur from identifying one or more synchronization groups and one or more numerology groups from CCs 205. In some aspects, CCs belonging to a synchronization group are synchronous with each other (e.g., have frames or slots that are time-aligned) and CCs belonging to a numerology group share a same numerology with each other. In some examples, CCs 205 may be split among both numerology groups and synchronization groups. For example, CCs 205 may be first split into numerology groups, and then from each numerology group, the CCs 205 associated with a numerology group may be split into synchronization groups. In another example, CCs 205 may be first split into synchronization groups, and then from each synchronization group the CCs 205 associated with a synchronization group may be split into numerology groups.

In some examples, each synchronization group may correspond to one of a plurality of uplink control channel (e.g., physical uplink control channel (PUCCH)) groups. That is, a set of timing synchronized cells may be considered to be an uplink control channel group, and different uplink control channel groups may be asynchronous to each other. HARQ ACK codeword feedback may be constructed within each uplink control channel group (e.g., to be provided via a common uplink control channel message).

Once UE 115-a or base station 105-a identifies CCs 205 belonging to both one or more synchronization groups and one or more numerology groups, UE 115-a or base station 105-a may determine a control channel processing limit for each of CCs 205 based at least in part on the identified synchronization groups, the identified numerology groups, and the UE capability. In determining the control channel processing limit for each CC 205, UE 115-a or base station 105-a may allocate portions of the capability to each of the synchronization groups. The capability may be allocated in a number of ways including based on a proportion of a number of downlink CCs of each synchronization group to a total number of downlink CCs of the CA configuration, equally between each synchronization group, and based on respective weighting factors for each synchronization group (e.g., a group having a primary cell may be assigned a higher weighting factor). The downlink CCs of the CA configuration may refer to either configured downlink CCs or active downlink CCs (e.g., downlink CCs that are configured and activated). In some examples, a portion of the capability may be allocated to a synchronization group containing a primary cell (e.g., a primary cell for a master cell group (MCG)) or a primary secondary cell (e.g., a primary cell for a secondary cell group (SCG)) first, and the remaining portion of the capability may then be allocated to the synchronization groups (e.g., including the group with the primary cell or the primary secondary cell). That is, the synchronization group containing the primary cell may be allocated a reserved portion of the capability in addition to a divided portion of the capability.

In some examples, among one or more synchronization groups, the capability may be allocated among numerology groups belonging to a synchronization group in proportion to downlink CCs, equally, or weighted proportions. Additionally, a portion of the capability may be first allocated for the group containing the primary cell, with the remainder allocated to all groups (e.g., including the group containing the primary cell), or the other groups according to these allocation techniques. Base station 105-a may further ensure that a control channel processing parameter (e.g., number of CCEs or BDs) for CCs of a given numerology group does not exceed the per-numerology group limit within a given slot. In some cases, base station 105-a may also ensure that the control channel processing parameter does not exceed the non-CA limit for any CCs within a given slot. Additionally or alternatively, the non-CA limit may be exceeded for certain CCs (e.g., primary cell (PCell), primary secondary cell (PSCell)). That is, overbooking may be allowed for the control channel processing parameter for certain CCs, and the base station 105-a and UE 115-a may apply overbooking handling rules to determine monitoring of control channels. In this case, base station 105-a may ensure that a control channel processing parameter for CCs of the numerology group that contains certain CCs (e.g., PCell, PSCell) does not exceed the per-numerology group limit within a given slot after overbooking handling rules are applied.

In some cases, in determining the control channel processing limit for each CC 205, UE 115-a or base station 105-a may allocate portions of the capability to each of the numerology groups (e.g., in proportion to downlink CCs, equally, weighted proportions or additionally first allocating a portion of the capability for the group containing the primary cell). In some examples, the capability may be allocated among synchronization groups belonging to a numerology group (e.g., in proportion to downlink CCs, equally, weighted proportions or additionally first allocating a portion of the capability for the group containing the primary cell). Base station 105-a may further ensure that a control channel processing parameter (e.g., number of CCEs or BDs) for CCs of a given synchronization group does not exceed the per-synchronization group limit within a given slot. In some cases, base station 105-a may also ensure that the control channel processing parameter does not exceed the non-CA limit for any CCs within a given slot. Additionally or alternatively, the non-CA limit may be exceeded for certain CCs (e.g., PCell, PSCell). That is, overbooking may be allowed for the control channel processing parameter for certain CCs, and the base station 105-a and UE 115-a may apply overbooking handling rules to determine monitoring of control channels. In this case, base station 105-a may ensure that a control channel processing parameter for CCs of the synchronization group that contains certain CCs (e.g., PCell, PSCell) does not exceed the per-synchronization group limit within a given slot after overbooking handling rules are applied.

In a second set of examples, the UE capability may be split into numerology groups, with the per-numerology group limits observed by a worst-case or pseudo worst-case evaluation. For example, base station 105-a and UE 115-a may first split CCs 205 into numerology groups. Base station 105-a and UE 115-a may determine a control channel processing limit for each numerology group based at least in part on a capability of UE 115-a. With the control channel processing limit for each numerology group, base station 105-a may establish a control channel configuration for UE 115-a for a plurality of slots of CCs 205. The control channel configuration may be based at least in part on ensuring that a combined value for control channel processing parameters of the one or more numerology groups across the plurality of slots do not exceed the respective control channel processing limits of the one or more numerology groups.

In some examples, the base station 105-a may determine the combined value for the control channel processing parameter for each of the one or more numerology groups by summing the largest number for the control channel processing parameter for each synchronization group belonging to the numerology group for each slot. In another example, the combined value for the control channel processing parameter may be determined by summing the largest value for the control channel processing parameter for each CC 205 for each slot. In some examples, the base station 105-a may ensure that, across each slot, a value for the control channel processing parameter for a primary cell (e.g., PCell, PSCell) for each slot, in addition to the combined value for the control channel processing parameter for SCells, does not exceed the per-numerology limit after overbooking handling rules are applied to the PCell or PSCell, if the numerology group contains the PCell or PSCell.

In some cases, base station 105-a may determine the combined value for the control channel processing parameter for each numerology group by evaluating the control channel processing parameter across a range of slots of different synchronization groups within the numerology group. For example, base station 105-a may, for each slot, determine a combined value for a control channel processing parameter for a reference synchronization group of a numerology group based at least in part on summing the largest number for the control channel processing parameter for other synchronization groups of the numerology group within a range of slots relative to the each slot. In some examples, base station 105-a may determine respective combined values for the control channel processing parameter for each synchronization group by summing, for a slot, respective largest numbers for the control channel processing parameter for other synchronization groups within a range of slots relative to the slot. Base station 105-a may then establish a control channel configuration for UE 115-a for each slot that ensures that the combined value does not exceed the control channel processing limit of the numerology group after overbooking handling rules are applied to the primary cell.

In some cases, when base station 105-a determines that a control channel processing parameter for a respective numerology group exceeds the respective control channel processing limit for the numerology group, base station 105-a may modify the CA configuration or the control channel configuration using techniques described above or with other techniques to bring the CA configuration or the control channel configuration into accordance with the control channel processing limit. Base station 105-a may then transmit the modified CA configuration or the control channel configuration to UE 115-a.

The techniques utilized by wireless communications system 100 may determine a number of CCEs to process and/or the number of blind decodes to perform for one or more CCs of a CA configuration. Ensuring that CCs are configured to allow UE 115-a to process all the CCEs and blind decodes associated with the CCs may allow UE 115-a to correctly receive all the control channels transmitted from base station 105-a. As discussed above, some CCs may be cross-carrier scheduled, and in some cases timing asynchronous cells do not cross-carrier schedule each other (e.g., cross-carrier scheduling may be performed only within synchronization groups). Additionally or alternatively, cross carrier scheduled CCs may be included in the synchronization group of the scheduling CC. For example, CCs 205 may include a first CC that is scheduled by a second CC that is asynchronous to the first CC, where the first CC is included in a synchronization group associated with the second CC.

Figure 3A:
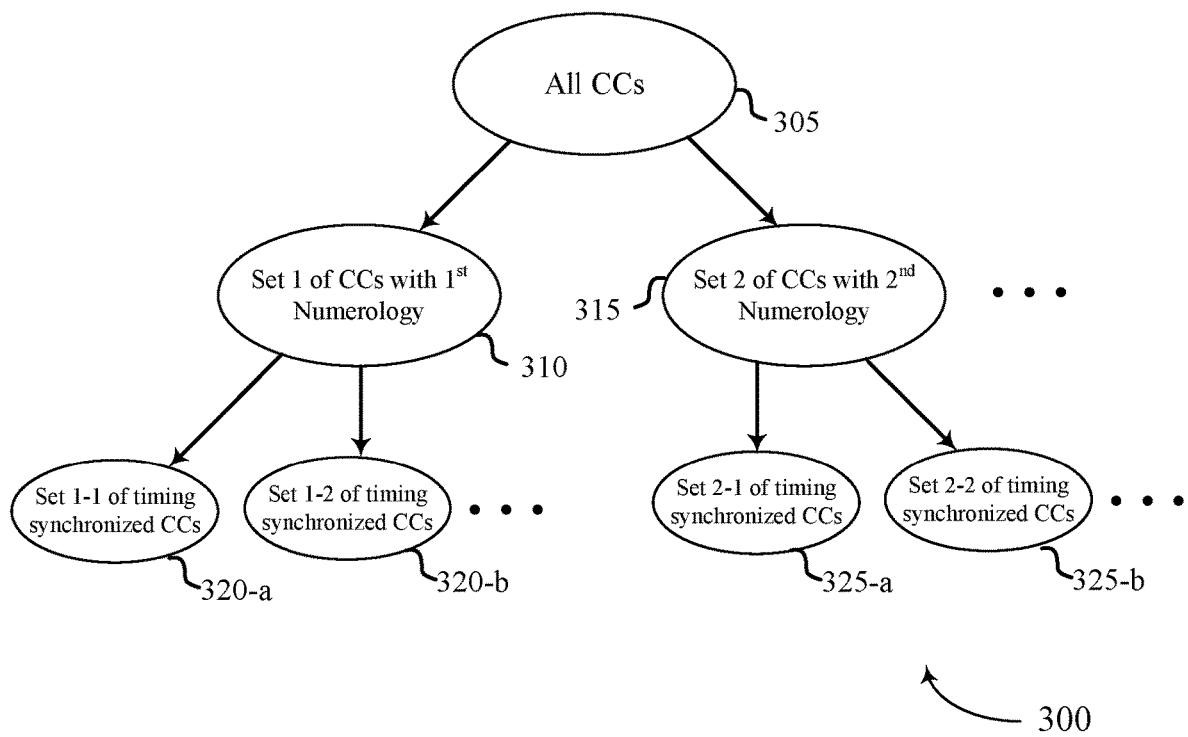
FIGS. 3A and 3B illustrate examples of capability groupings that support control channel processing for asynchronous cells in accordance with aspects of the present disclosure.

FIG. 3A illustrates an example of a capability grouping 300 that supports control channel processing for asynchronous cells in accordance with aspects of the present disclosure. In some examples, capability grouping 300 may be implemented by aspects of wireless communication system 100 and/or 200.

FIG. 3A illustrates an example of capability grouping 300 which may illustrate techniques described within. Capability grouping 300 illustrates a grouping of all CCs of a particular CA configuration set 305. Base station 105 or UE 115 may split a UE capability into a series of capability groupings. In some cases, determining a control channel processing limit within a set of CCs, such as set 305, may occur from identifying one or more synchronization groups and one or more numerology groups from a set of CCs. In some aspects, CCs belonging to a synchronization group are synchronous with each other while CCs belonging to a numerology group share a same numerology with each other. In some examples, a set of CCs may be split among both numerology groups and synchronization groups.

Set 305 may be divided into subsets 310 and 315. Subsets 310 and 315 may be split from set 305 based on various numerologies of the CCs of set 305. For example, the CCs belonging to set 310 may share a same numerology with each other while the CCs belonging to set 315 may share a same numerology with each other (while having a different numerology from set 310). Although not illustrated, more sets of CCs having different numerologies from sets 310 and 315 may be present. Sets 310 and 315 may be split further on the basis of timing synchronization. For example, the CCs belonging to set 320-a may be CCs of set 310 that are synchronous with each other while the CCs belonging to set 320-b may be CCs of set 310 that are synchronous with each other (while having different timing than CCs of set 320-a). Although not illustrated, more sets of CCs having a different synchronization from sets 320-a and 320-b may be present (each having the same numerology as set 310). In another example, the CCs belonging to set 325-a may be CCs of set 315 that are synchronous with each other while the CCs belonging to set 325-b may be CCs of set 315 that are synchronous with each other (while having different timing than CCs of set 325-a). Accordingly, sets 325-a and 325-b may be asynchronous with each other. Although not illustrated, more sets of CCs having a different synchronization from sets 325-a and 325-b may exist (while having a same numerology).

UE 115 or base station 105 may determine a control channel processing limit for each of the CCs of the CA configuration based at least in part on the identified synchronization groups, the identified numerology groups, and the UE capability. For example, the UE capability may first be divided among numerology groups (e.g., using proportional, equal, or weighted allocations), and then the per-numerology limits may be divided among synchronization groups within each numerology group (e.g., using proportional, equal, or weighted allocations). For example, if the dividing is proportional to the number of DL CCs, the control channel processing limit for each numerology group and each synchronization group (synchronization group i) with the numerology μ is determined by equations (1) and (2):

$$(\text{capability} \times \text{number of DL CCs within numerology } \mu) \div \text{total number of DL CCs} \qquad (1)$$

$$\text{Floor}((\text{non CA processing bound for } \mu \times \text{capability} \times \text{number of DL CCs with numerology } \mu \text{ in synchronization group i}) \div \text{total number of DL CCs}) \qquad (2)$$

Figure 3B:
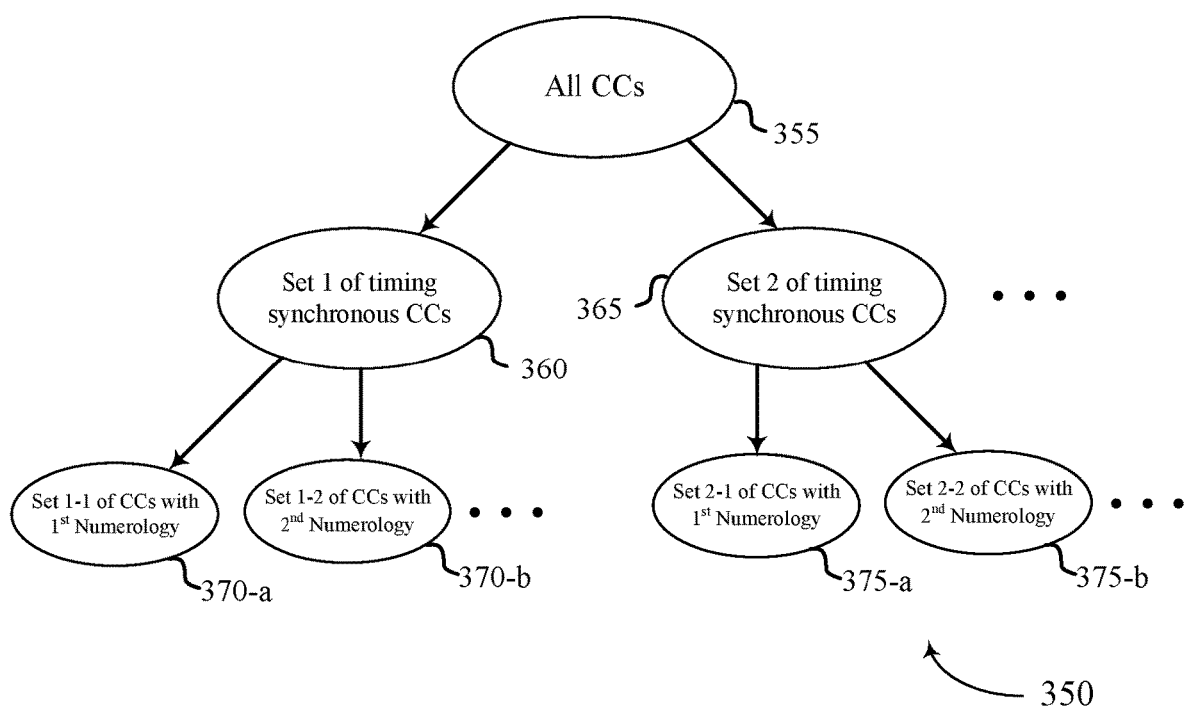

FIG. 3B illustrates an example of a capability grouping 350 that supports control channel processing for asynchronous cells in accordance with aspects of the present disclosure. In some examples, capability grouping 350 may be implemented by aspects of wireless communication system 100 and/or 200.

FIG. 3B illustrates an example of capability grouping 350 which may illustrate techniques described within. Capability grouping 350 illustrates a grouping of all CCs of a particular CA configuration set 355. Base station 105 or UE 115 may split a UE capability into a series of capability groupings. In some cases, determining a control channel processing limit within a set of CCs, such as set 355, may occur from identifying one or more synchronization groups and one or more numerology groups from a set of CCs. In some aspects, CCs belonging to a synchronization group are synchronous with each other while CCs belonging to a numerology group share a same numerology with each other. In some examples, a set of CCs may be split among both numerology groups and synchronization groups.

Set 355 may be divided into subsets 360 and 365. Subsets 360 and 365 may be split from set 355 based on various timing synchronizations of the CCs of set 355. For example, the CCs belonging to set 360 may share a same timing synchronization with each other while the CCs belonging to set 365 may share a same timing synchronization with each other (while being asynchronous from CCs in set 360). Although not illustrated, more sets of CCs having different timing synchronizations from sets 360 and 365 may be present.

Sets 360 and 365 may be split further on the basis of numerology. For example, the CCs belonging to set 370-a may be CCs of set 360 that share a same numerology with each other while the CCs belonging to set 370-b may be CCs of set 360 that share a same numerology with each other (e.g., while having a different numerology than set 370-a). Although not illustrated, more sets of CCs having a different numerology from sets 370-a and 370-b may be present within set 360. In another example, the CCs belonging to set 375-a may be CCs of set 365 that share a same numerology with each other while the CCs belonging to set 375-b may be CCs of set 365 that share a same numerology with each other (e.g., while having a different numerology than set 375-a). Although not illustrated, more sets of CCs having a different numerology from sets 375-a and 375-b may be present within set 365).

UE 115 or base station 105 may determine a control channel processing limit for each of the CCs of the CA configuration based at least in part on the identified synchronization groups, the identified numerology groups, and the UE capability. For example, the capability may be allocated for timing synchronized CCs for a synchronization group i by equation (3):

$$(\text{capability} \times \text{number of DL CCs within synchronization group i}) \div \text{total number of DL CCs} \qquad (3)$$

In determining the control channel processing limit for numerology groups within each synchronization group, UE 115 or base station 105 may distribute respective portions of the capability among numerology groups within each of the one or more synchronization groups based at least in part on respective numbers of downlink CCs of the one or more numerology groups within each of the one or more synchronization groups. Upon splitting set 305 into respective numerology and synchronization groups, a control channel processing limit for timing synchronized CCs with a numerology μ for a synchronization group i may be calculated by equation (4):

$$\text{Floor}((\text{non CA processing bound for } \mu \times \text{capability} \times \text{number of DL CCs with numerology } \mu \text{ in synchronization group i}) \div \text{total number of DL CCs}) \quad (4)$$

Additionally or alternatively, UE 115 or base station 105 may distribute respective portions of the capability among numerology groups within each of the one or more synchronization groups according to equal proportions or weighted proportions, or additionally by first allocating a portion of the capability for the group containing the primary cell. The UE 115 may monitor control channels for each CC of the CA configuration according to the distributed capability.

Although described for downlink CCs, it should be understood that the techniques described above may also apply to uplink CCs.

Figure 4:
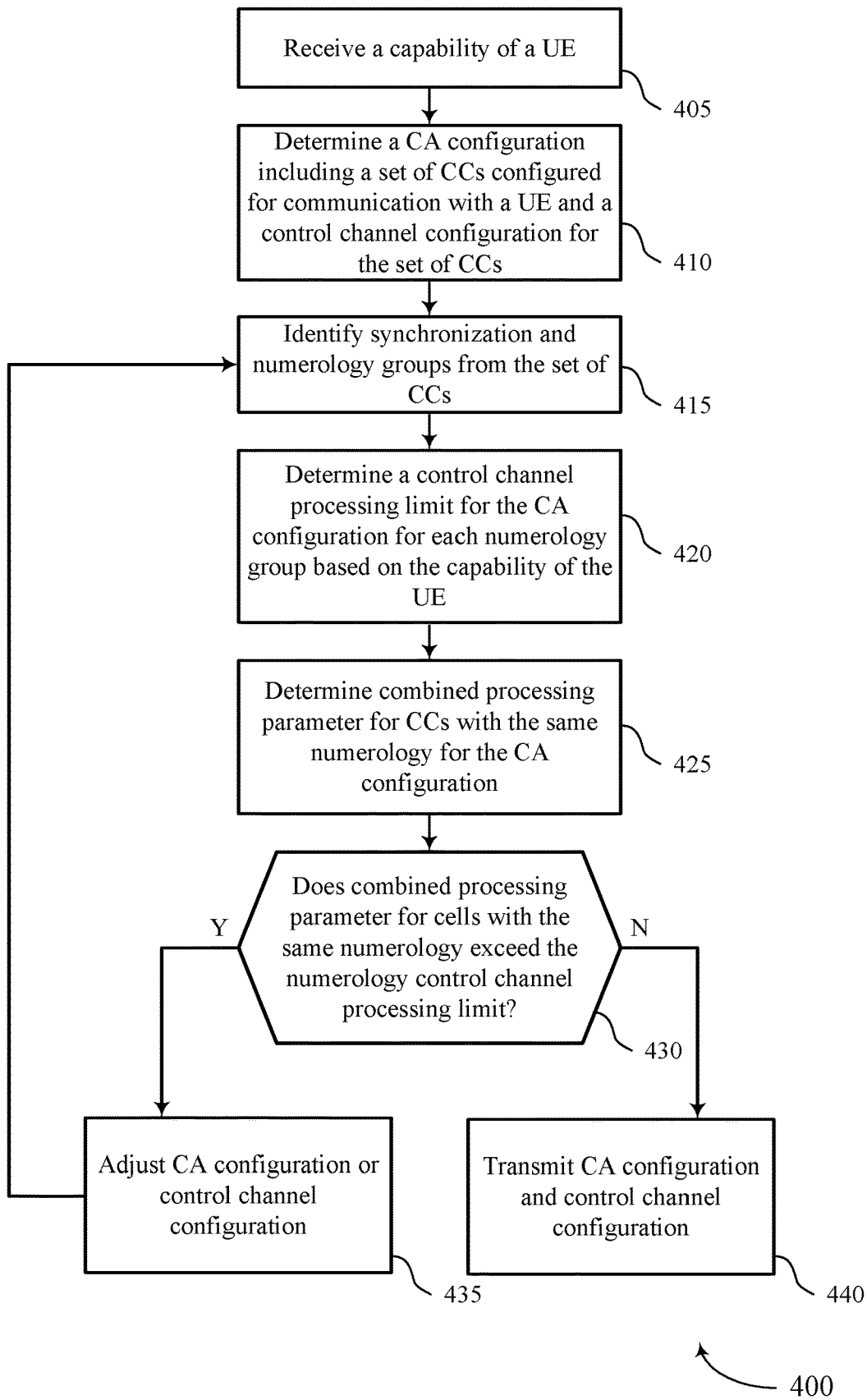
FIG. 4 illustrates an example of a process flow that supports control channel processing for asynchronous cells in accordance with aspects of the present disclosure.

FIG. 4 illustrates an example of a process flow 400 that supports control channel processing for asynchronous cells in accordance with aspects of the present disclosure. In some examples, the techniques described within process flow 400 may describe techniques for control channel processing for asynchronous cells that may vary from the techniques described with respect to FIGS. 3A and 3B, however, some techniques described with respect to FIGS. 3A, 3B, and FIG. 4 may overlap. In some examples, process flow 400 may be implemented by aspects of wireless communication system 100 and/or 200. In some examples, a base station may execute a set of instructions to control the functional elements of the base station to perform the functions described below. Additionally or alternatively, a base station may perform aspects of the functions described below using special-purpose hardware.

At 405, the base station may receive a capability of a UE. For example, a UE may report a capability corresponding to the number of CCs the UE may support for control channel decoding for CA.

At 410, the base station may determine a CA configuration including a set of CCs configured for communication with the UE, and a control channel configuration including control channel candidates and their locations (e.g., CCEs) within the configured control channels.

At 415, the base station may identify synchronization and numerology groups from the set of CCs. For example, the base station may first group the set of CCs of the CA configuration according to numerology and then identify synchronization groups within each numerology group.

At 420, the base station may determine a control channel processing limit for the CA configuration for each numerology group based on the capability of the UE. As discussed above with reference to FIG. 3A, the per-numerology control channel processing limit may be determined in proportion to the number of DL cells in each numerology group to the total number of DL cells, or may be determined using equal splitting or proportional splitting with weighting factors for different numerology groups.

At 425, the base station may determine a combined processing parameter for CCs with the same numerology for the CA configuration and the control channel configuration. The combined processing parameter may be determined based on the largest total number of BDs or CCEs for SCells across slots in each set of timing synchronized cells. That is, the base station may determine, for each synchronization group within a given numerology group, the largest total number of BDs or CCEs within any given slot. The base station may then sum these numbers across the synchronization groups to obtain the combined processing parameter. The combined processing parameter may thus represent a worst-case scenario where the largest number of BDs or CCEs in asynchronous slots overlap or occur within the processing timeline for a UE for the BDs or CCEs. Alternatively, the base station may determine the combined processing parameter by summing the largest number of BDs or CCEs of each cell across slots. That is, the largest number of BDs or CCEs for each cell may be determined and summed to determine the combined processing parameter. In some cases, the PCell (or PSCell) may be considered on a per-slot basis. That is, the combined processing parameter may correspond to the sum (e.g., per-slot) of the PCell (e.g., or PSCell) and the largest number of BDs or CCEs across slots (e.g., largest number per synchronization group summed or the largest number for each cell summed) in the numerology group that contains the PCell or the PSCell. For numerologies without the PCell (e.g., or PSCell), the per-slot BD or CCE number may be considered to be zero.

At 430, the base station may compare the combined processing parameter for each numerology with the respective control channel processing limit for the numerology. If the combined processing parameter for a numerology exceeds the control channel processing limit for the numerology, the base station may adjust the CA configuration (e.g., adjusting which CCs are present in the CA configuration) or the control channel configuration (e.g., changing the periodicity, size, or position of control channels or search space sets) at 435. Upon adjusting the CA configuration or control channel configuration at 435, the base station may repeat the determination of the per-numerology control channel processing limits and combined processing parameters at steps 420, 425, and 430 for the adjusted configurations. If, at 430, the combined processing parameter for each numerology is determined to not exceed the respective control channel processing limit, the base station may transmit the CA configuration and control channel configuration to the UE at 440.

In some examples, the base station base station 105 may determine a combined processing parameter (e.g., at 425) for a control channel processing parameter (e.g., blind decodes or CCEs) for a numerology group by summing the largest number for the control channel processing parameter within a range of slots.

Figure 5:
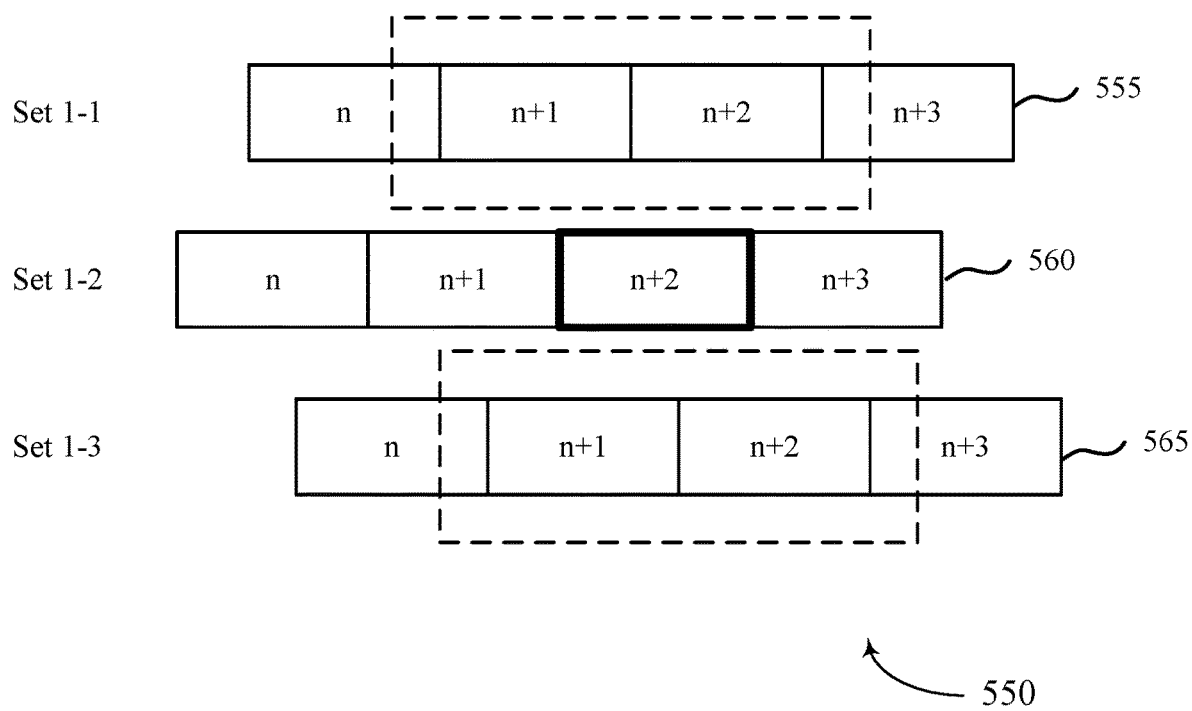
FIG. 5 illustrates an example of a synchronization group timing diagram that supports control channel processing for asynchronous cells in accordance with aspects of the present disclosure.

FIG. 5 illustrates a synchronization group timing diagram 550 that supports control channel processing for asynchronous cells in accordance with aspects of the present disclosure. In some examples, synchronization group timing diagram 550 may be implemented by aspects of wireless communication system 100 and/or 200.

Synchronization group timing diagram 550 illustrates CC timing set 1-1 555 representative of a first synchronization group (e.g., set 1-1 may correspond to subset 320-*a* illustrated in FIG. 3A), a CC timing set 1-2 560 representative of a second synchronization group (e.g., set 1-2 may correspond to subset 320-*b* illustrated in FIG. 3A), and CC timing set 1-3 560 representative of a third synchronization group (e.g., set 1-3 may correspond to an additional subset 320 of numerology group 310 of FIG. 3A). CC timing set 1-1 555, CC timing set 1-2 560, and CC timing set 1-3 565 may all share a same numerology. However, they are asynchronous to each other and thus a slot for one timing set may overlap with multiple slots for a different timing set, and the overlapping condition may dynamically change. Although not illustrated, more CC timing sets of different synchronization groups having a same numerology with CC 555, CC 560, and CC 565 may be present.

Base station 105 may assign CC timing set 1-2 560, as a reference synchronization group. In some cases, base station 105 may determine a combined value for control channel processing parameters (e.g., number of blind decodes, CCEs) for a reference synchronization group (e.g., CC timing set 1-2 560) based at least in part on summing, for each slot across slots of the CA configuration, a largest number for the control channel processing parameter for other synchronization groups of the same numerology group within a range of slots relative to each slot of the reference synchronization group. For example, base station 105 may designate slot n+2 of CC timing set 1-2 560 as a slot to begin calculating the largest numbers for a control channel processing parameter for each of the synchronization groups. Base station 105 may then determine that the slot range is defined by slots n+1 and n+2 of CC timing set 1-1 555 and CC timing set 1-3 565, respectively. In some examples, the range of slots may be longer or shorter than the ranges illustrated in FIG. 5. For example, the range of slots may be given by [n–N, n+M], where n is the slot number and N and M are integers defining the range.

Base station 105 may determine a total number of the control channel processing parameter for the reference synchronization group for each slot by summing the control channel processing parameter for the reference synchronization group for the slot, and for slots of the other synchronization groups having the largest number for the control channel processing parameter within the range of slots. For example, FIG. 5 illustrates a summation of the control channel processing parameters of slot n+2 of CC timing set 1-2 560 with the largest control channel processing parameters of either slot n+1 or slot n+2 (e.g., N=1, M=0) for CC timing set 1-1 555 and CC timing set 1-3 565 (slots n+1 and n+2 of CC timing set 1-1 555 and CC timing set 1-3 565 may represent overlapping slots with respect to slot n+2 of the reference synchronization group, CC timing set 1-2 560). Thus, the largest number for a given reference synchronization group on a per slot basis may be determined. Base station 105 may perform the determination for each synchronization group, and may then determine the combined processing parameter based on the reference synchronization group having the largest number for the control channel processing parameter. Alternatively, the base station may perform the determination of the largest number for the control channel processing parameter using a single reference synchronization group (e.g., synchronization group that contains the PCell or PSCell).

In some examples, base station 105 may filter the control channel processing parameter across one or more of the slots of the CA configuration and apply the filtered parameter in the determined combined value. For example, the filter may generate an average (e.g., multiple slot average, running average) across a range of slots.

With the determined combined value, base station 105 may establish a control channel configuration for a UE 115 across the slots of the CA configuration based at least in part on comparing the combined value to a control channel processing limit of the numerology group associated with the reference synchronization group. For example, the base station 105 may perform the steps of FIG. 4 to establish a CA configuration and control channel configuration for transmission to the UE 115.

Figure 6:
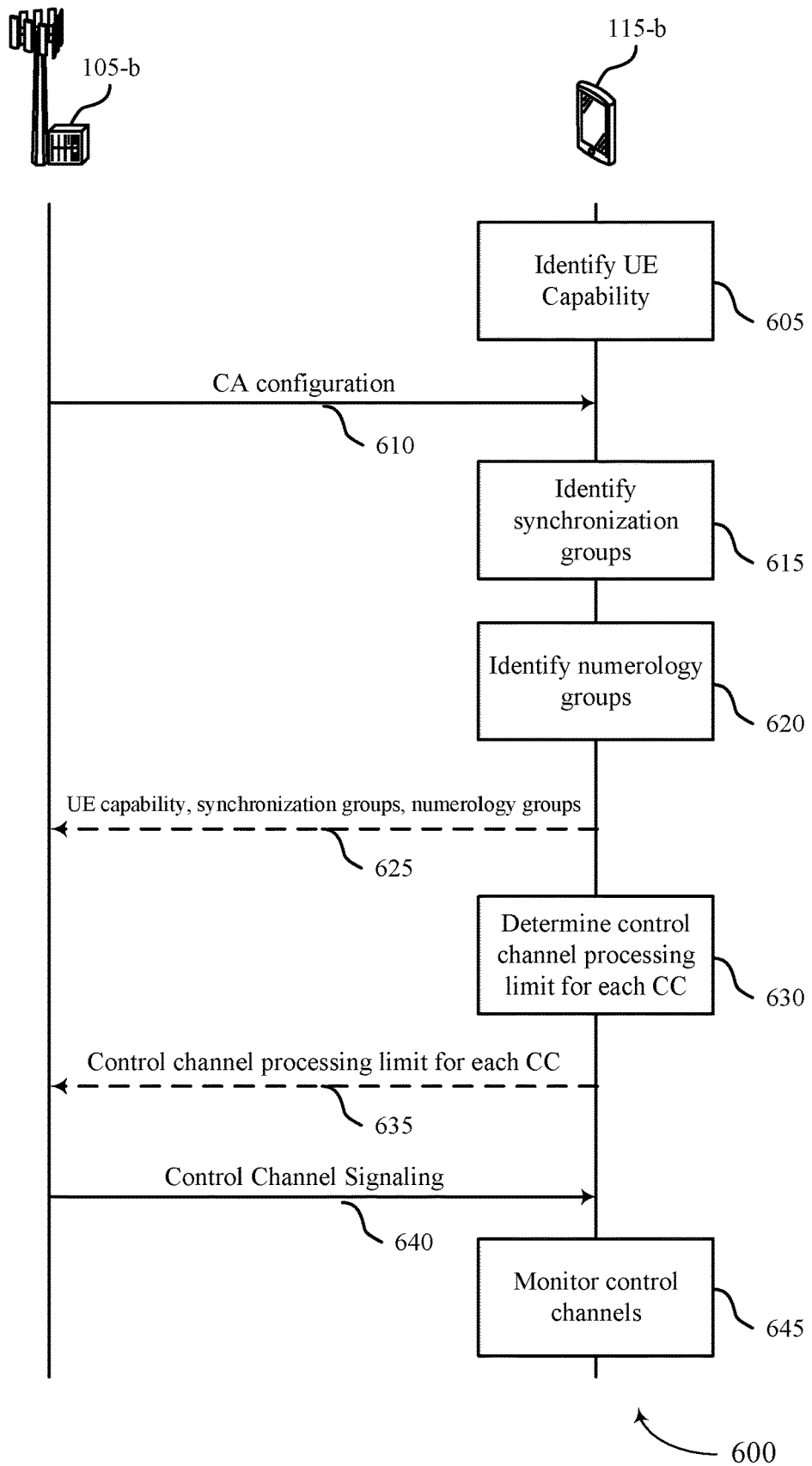
FIG. 6 illustrates an example of a flow diagram that supports control channel processing for asynchronous cells in accordance with aspects of the present disclosure.

FIG. 6 illustrates an example of a process flow 600 that supports control channel processing for asynchronous cells in accordance with aspects of the present disclosure. In some examples, process flow 600 may be implemented by aspects of wireless communication system 100. Process flow 600 may include a base station 105-*b* and a UE 115-*b*, which may be examples of corresponding base stations 105 and UEs 115, respectively, as described above with reference to FIGS. 1-5.

In the following description of the process flow 600, the operations between UE 115-*b* and base station 105-*b* may be performed in different orders or at different times. Certain operations may also be left out of the process flow 600, or other operations may be added to the process flow 600. It is to be understood that while UE 115-*b* and base station 105-*b* are shown performing a number of the operations of process flow 600, any wireless device may perform the operations shown.

At 605, UE 115-*b* may identify a UE capability which may be a number of CCs that UE 115-*b* may support for control channel decoding for CA. At 610, base station 105-*b* may transmit, and UE 115-*b* may receive, a CA configuration. The CA configuration may contain a set of CCs configured for communication between base station 105-*b* and UE 115-*b*.

At 615 and 620, UE 115-*b* may identify one or more synchronization groups and one or more numerology groups from the set of CCs. CCs belonging to a same synchronization group are synchronous with each other and CCs belonging to a same numerology group share a same numerology with each other. It is noted that UE 115-*b* may identify the one or more synchronization groups and the one or more numerology groups in any order or at the same time (synchronization groups may be determined that also share numerologies, or numerology groups may be determined that also share timing synchronization). Also, base station 105-*b* may independently determine the UE capability (e.g., based on other signaling or default parameters) and the one or more synchronization groups and the one or more numerology groups of the CA configuration independently from UE 115-*b*, or it may receive an indication of the one or more synchronization groups, the one or more numerology groups, and the UE capability at 625.

At 630, UE 115-*b* may determine a control channel processing limit for each CC of the set of CCs of the CA configuration based at least in part on the one or more synchronization groups, the one or more numerology groups, and the capability. The control channel processing limits may be determined according to the techniques discussed above with reference to FIG. 2, 3A, or 3B. Also, base station 105-*b* may independently determine the control channel processing limit for each CC of the set of CCs of the CA configuration independently from UE 115-*b*, or it may receive an indication of the control channel processing limit at 635.

At 640, base station 105-*b* may transmit, and UE 115-*b* may receive, control channel signaling for each CC of the CA configuration in accordance with the determined control channel processing limits. At 645, UE 115-*b* may monitor the control channels in accordance with the determined control channel processing limits.

Figure 7:
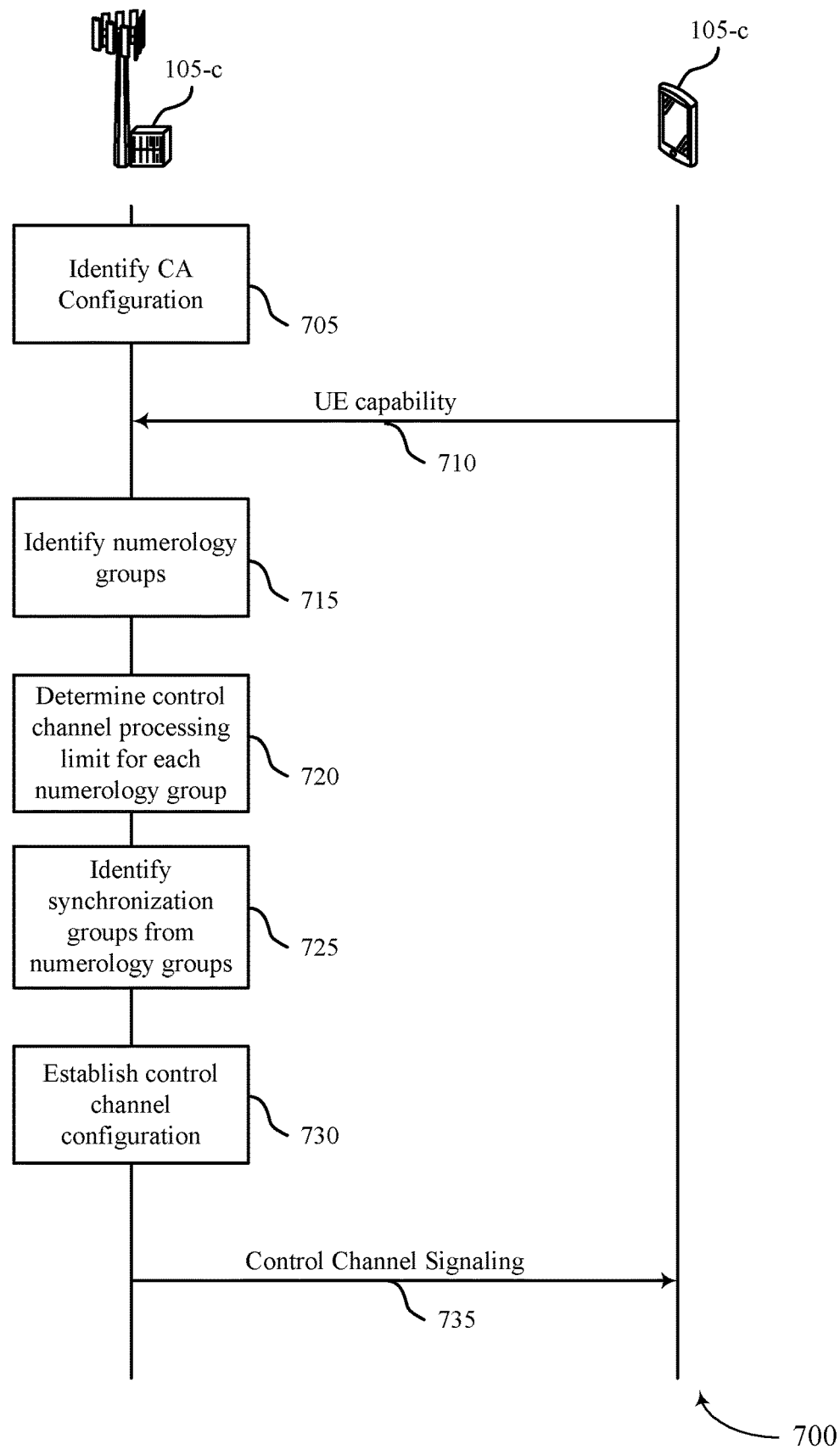
FIG. 7 illustrates an example of a flow diagram that supports control channel processing for asynchronous cells in accordance with aspects of the present disclosure.

FIG. 7 illustrates an example of a process flow 700 that supports control channel processing for asynchronous cells in accordance with aspects of the present disclosure. In some examples, process flow 700 may be implemented by aspects of wireless communication system 100 and/or 200. Process flow 700 may include a base station 105-*c* and a UE 115-*c*, which may be examples of corresponding base stations 105 and UEs 115, respectively, as described above with reference to FIGS. 1-5.

In the following description of the process flow 700, the operations between UE 115-c and base station 105-c may be performed in different orders or at different times. Certain operations may also be left out of the process flow 700, or other operations may be added to the process flow 700. It is to be understood that while UE 115-c and base station 105-c are shown performing a number of the operations of process flow 700, any wireless device may perform the operations shown.

At 705, base station 105-c may identify a CA configuration. The CA configuration may contain a set of CCs configured for communication between base station 105-c and UE 115-c. At 710, UE 115-c may identify a UE capability which may be a number of CCs that UE 115-c may support for control channel decoding for CA. UE 115-c may transmit the UE capability to base station 105-c.

At 715, base station 105-c may identify one or more numerology groups from the set of CCs. CCs belonging to a same numerology group share a same numerology with each other. At 720, base station 105-c may determine a control channel processing limit for each numerology group based at least in part on the UE capability.

At 725, base station 105-c may identify one or more synchronization groups for each of the numerology groups. Each synchronization group contains CCs that are synchronous with each other and share a same numerology.

At 730, base station 105-c may establish a control channel configuration for UE 115-c across slots of the CA configuration. Base station 105-c may utilize various techniques for establishing the control channel configuration. For example, the control channel configuration may be based at least in part on comparing a maximum value for a control channel processing parameter of the one or more synchronization groups across slots of the CA configuration to a respective control channel processing limit of each of the synchronization groups. In another example, the control channel configuration may be based at least in part on comparing a combined value for a control channel processing parameter for a reference numerology group to a control channel processing limit of the respective numerology group. The combined value for the control channel processing parameter may be determined, for example, by summing the largest value for the channel processing parameter for each of the synchronization groups across all or a range of slots. Additionally or alternatively, the largest value for each cell may be summed. In some cases, the PCell (or PSCell) may be considered on a per-slot basis.

At 735, base station 105-c may transmit, and UE 115-c may receive, control channel signaling for each CC of the CA configuration.

Figure 8:
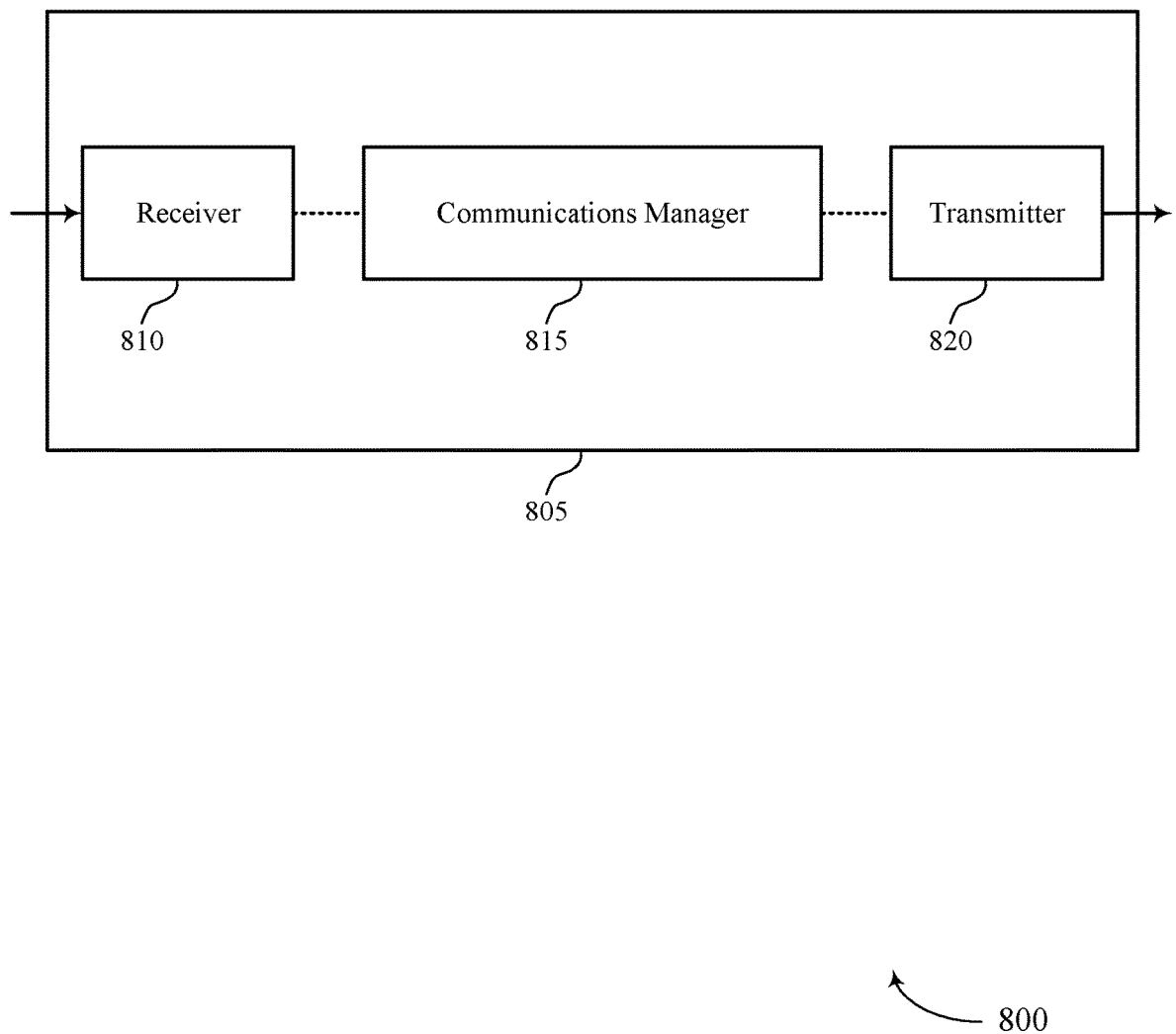
FIGS. 8 and 9 show block diagrams of devices that support control channel processing for asynchronous cells in accordance with aspects of the present disclosure.

FIG. 8 shows a block diagram 800 of a device 805 that supports control channel processing limits for asynchronous cells in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to control channel processing limits for asynchronous cells, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may identify a capability of the UE associated with a number of component carriers (CCs) the UE supports for control channel decoding for carrier aggregation (CA), identify a CA configuration including a set of CCs configured for communication for the UE, identify one or more synchronization groups from the set of CCs, identify one or more numerology groups from the set of CCs, determine a control channel processing limit for each CC of the set of CCs of the CA configuration based on the one or more synchronization groups, the one or more numerology groups, and the capability, and monitor one or more control channels associated with the set of CCs according to the determined control channel processing limit for each CC of the set of CCs.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The communications manager 815 as described herein may be implemented to realize one or more potential advantages. One implementation may allow a UE 115 to save power and increase battery life by limiting the number of CCEs and blind decodes. Another implementation may provide improved quality and reliability of service at the UE 115, as latency and the number of separate resources allocated to the UE 115 may be reduced.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
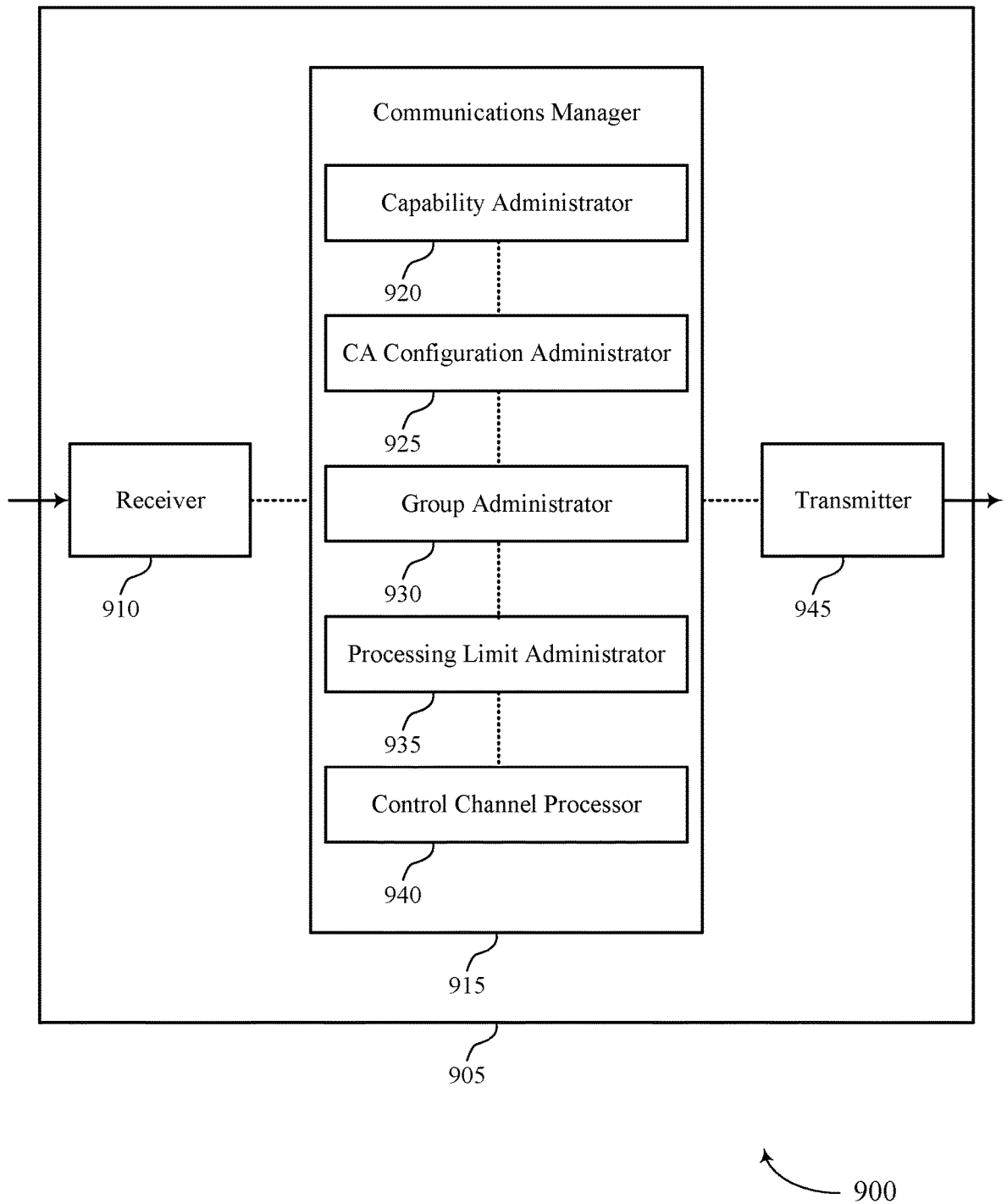

FIG. 9 shows a block diagram 900 of a device 905 that supports control channel processing limits for asynchronous cells in accordance with aspects of the present disclosure. The device 905 may be an example of aspects of a device 805, or a UE 115 as described herein. The device 905 may include a receiver 910, a communications manager 915, and a transmitter 945. The device 905 may also include a processor. Each of these components may be in communication with one another (e.g., via one or more buses).

The receiver 910 may receive information such as packets, user data, or control information associated with various information channels (e.g., control channels, data channels, and information related to control channel processing limits for asynchronous cells, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 1110 as described herein. The communications manager 915 may include a capability administrator 920, a CA configuration administrator 925, a group administrator 930, a processing limit administrator 935, and a control channel processor 940. The communications manager 915 may be an example of aspects of the communications manager 1110 described herein.

The capability administrator 920 may identify a capability of the UE associated with a number of component carriers (CCs) the UE supports for control channel decoding for carrier aggregation (CA).

The CA configuration administrator 925 may identify a CA configuration including a set of CCs configured for communication for the UE.

The group administrator 930 may identify one or more synchronization groups from the set of CCs, where CCs associated with each of the one or more synchronization groups are synchronous with each other and identify one or more numerology groups from the set of CCs, where CCs associated with each of the one or more numerology groups share a same numerology with each other.

The processing limit administrator 935 may determine a control channel processing limit for each CC of the set of CCs of the CA configuration based on the one or more synchronization groups, the one or more numerology groups, and the capability. The processing limit administrator 935 may determine a control channel processing limit for each of the one or more numerology groups based on a capability of the UE associated with a number of CCs the UE supports for control channel decoding for CA.

The control channel processor 940 may monitor one or more control channels associated with the set of CCs according to the determined control channel processing limit for each CC of the set of CCs.

The transmitter 945 may transmit signals generated by other components of the device 905. In some examples, the transmitter 945 may be collocated with a receiver 910 in a transceiver module. For example, the transmitter 945 may be an example of aspects of the transceiver 1120 described with reference to FIG. 11. The transmitter 945 may utilize a single antenna or a set of antennas.

Figure 10:
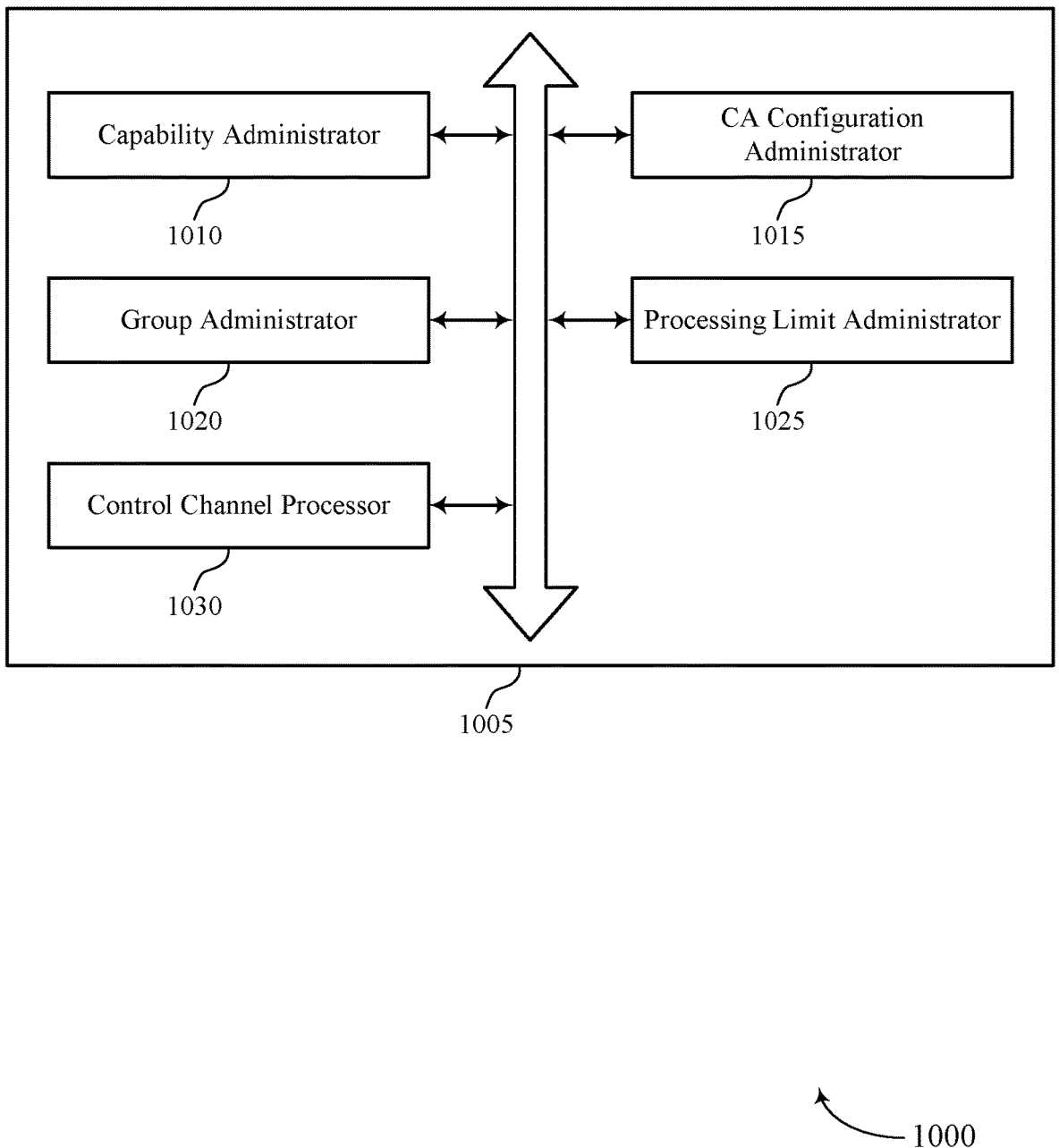
FIG. 10 shows a block diagram of a communications manager that supports control channel processing for asynchronous cells in accordance with aspects of the present disclosure.

FIG. 10 shows a block diagram 1000 of a communications manager 1005 that supports control channel processing limits for asynchronous cells in accordance with aspects of the present disclosure. The communications manager 1005 may be an example of aspects of a communications manager 815, a communications manager 915, or a communications manager 1110 described herein. The communications manager 1005 may include a capability administrator 1010, a CA configuration administrator 1015, a group administrator 1020, a processing limit administrator 1025, and a control channel processor 1030. Each of these modules may communicate, directly or indirectly, with one another (e.g., via one or more buses).

The capability administrator 1010 may identify a capability of the UE associated with a number of component carriers (CCs) the UE supports for control channel decoding for carrier aggregation (CA). In some examples, the capability administrator 1010 may allocate respective portions of the capability to each synchronization group of the one or more synchronization groups. In some examples, the capability administrator 1010 may allocate a portion of the capability to a synchronization group containing a primary cell or a primary secondary cell. In some examples, the capability administrator 1010 may allocate a remaining portion of the capability to the one or more synchronization groups. In some examples, the capability administrator 1010 may distribute the respective portions of the capability among numerology groups within each of the one or more synchronization groups based on respective numbers of downlink CCs of the one or more numerology groups within each of the one or more synchronization groups. In some examples, the capability administrator 1010 may allocate respective portions of the capability to each numerology group of the one or more numerology groups. In some examples, the capability administrator 1010 may distribute the respective portions of the capability among synchronization groups within each of the one or more numerology groups based on respective numbers of downlink CCs of the one or more synchronization groups within each of the one or more numerology groups.

The CA configuration administrator 1015 may identify a CA configuration including a set of CCs configured for communication for the UE.

The group administrator 1020 may identify one or more synchronization groups from the set of CCs. In some examples, the group administrator 1020 may identify one or more numerology groups from the set of CCs.

The processing limit administrator 1025 may determine a control channel processing limit for each CC of the set of CCs of the CA configuration based on the one or more synchronization groups, the one or more numerology groups, and the capability. In some examples, the processing limit administrator 1025 may determine a control channel processing limit for each of the one or more numerology groups based on a capability of the UE associated with a number of CCs the UE supports for control channel decoding for CA.

Figure 11:
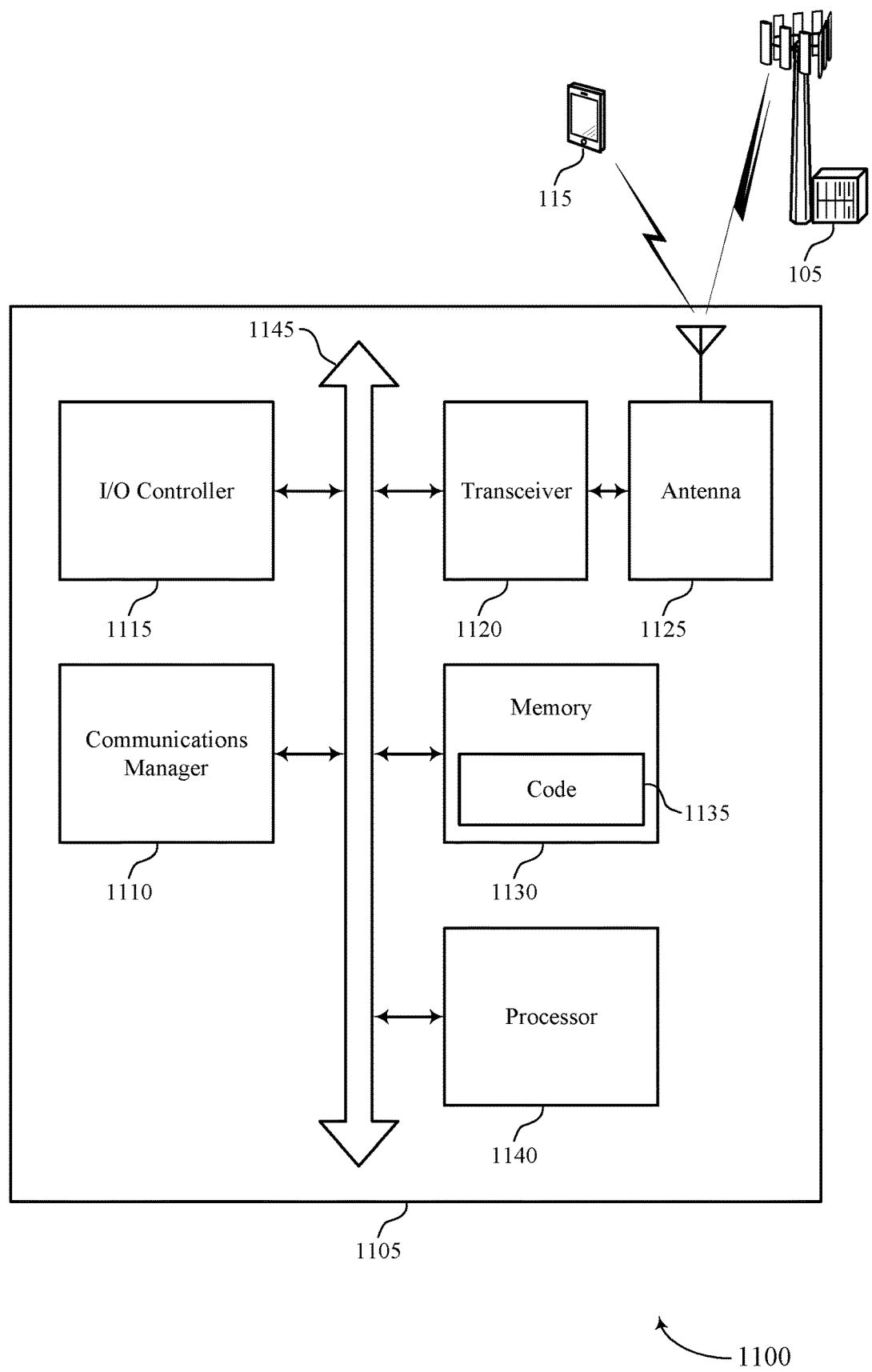
FIG. 11 shows a diagram of a system including a device that supports control channel processing for asynchronous cells in accordance with aspects of the present disclosure.

FIG. 11 shows a diagram of a system 1100 including a device 1105 that supports control channel processing limits for asynchronous cells in accordance with aspects of the present disclosure. The device 1105 may be an example of or include the components of device 905, device 1005, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may identify a capability of the UE associated with a number of component carriers (CCs) the UE supports for control channel decoding for carrier aggregation (CA), identify a CA configuration including a set of CCs configured for communication for the UE, identify one or more synchronization groups from the set of CCs, identify one or more numerology groups from the set of CCs, determine a control channel processing limit for each CC of the set of CCs of the CA configuration based on the one or more synchronization groups, the one or more numerology groups, and the capability, and monitor one or more control channels associated with the set of CCs according to the determined control channel processing limit for each CC of the set of CCs.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touch-screen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM and ROM. The memory 1130 may store computer-readable, computer-executable code 1135 including instructions that, when executed, cause the processor to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting control channel processing limits for asynchronous cells).

Based on a limiting of the number of non-overlapped CCEs and a number of blind decodes, a processor of a UE 115 may efficiently determine control channel configurations for a UE. As such, when the control channel configurations are received, the processor will effectively use its processing power towards the limited number of non-overlapped CCEs and blind decodes.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
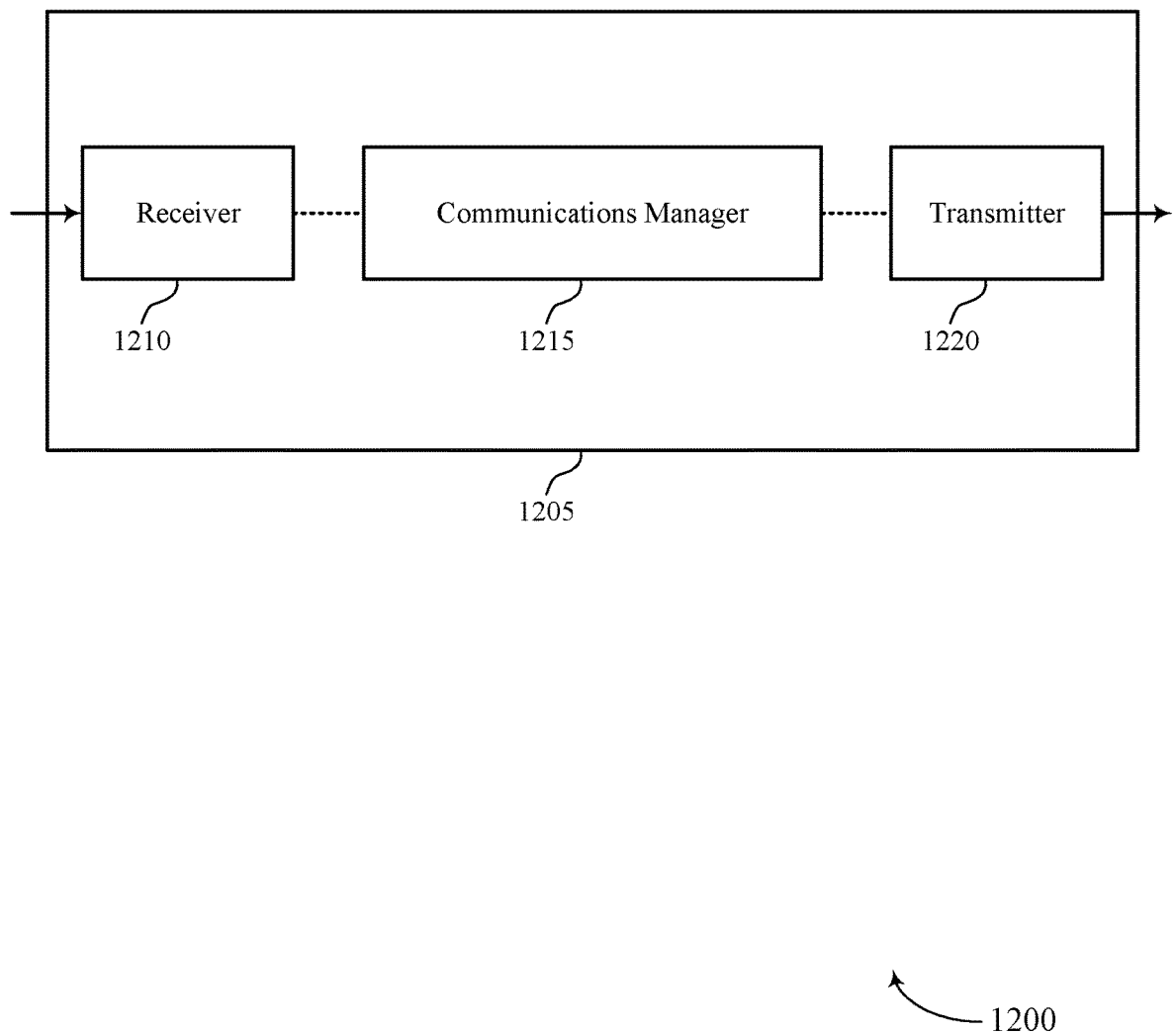
FIGS. 12 and 13 show block diagrams of devices that support control channel processing for asynchronous cells in accordance with aspects of the present disclosure.

FIG. 12 shows a block diagram 1200 of a device 1205 that supports control channel processing limits for asynchronous cells in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to control channel processing limits for asynchronous cells, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may transmit, to a UE, a carrier aggregation (CA) configuration including a set of component carriers (CCs) configured for communication with the UE, identify a control channel processing limit for each CC of the set of CCs of the CA configuration based on one or more synchronization groups from the set of CCs, one or more numerology groups from the set of CCs, and a capability of the UE associated with a number of CCs the UE supports for control channel decoding for CA, and transmit one or more control channels associated with the set of CCs in accordance with the control channel processing limit for each CC of the set of CCs. The communications manager 1215 may also identify a carrier aggregation (CA) configuration including a set of component carriers (CCs) configured for communication with a UE, identify one or more numerology groups from the set of CCs, identify one or more synchronization groups for each of the one or more numerology groups, determine a control channel processing limit for each of the one or more numerology groups based on a capability of the UE associated with a number of CCs the UE supports for control channel decoding for CA, and establish a control channel configuration for the UE for a set of slots based on comparing a combined value for a control channel processing parameter for the one or more synchronization groups of each of the one or more numerology groups across the set of slots to the respective control channel processing limit of the each of the one or more numerology groups. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
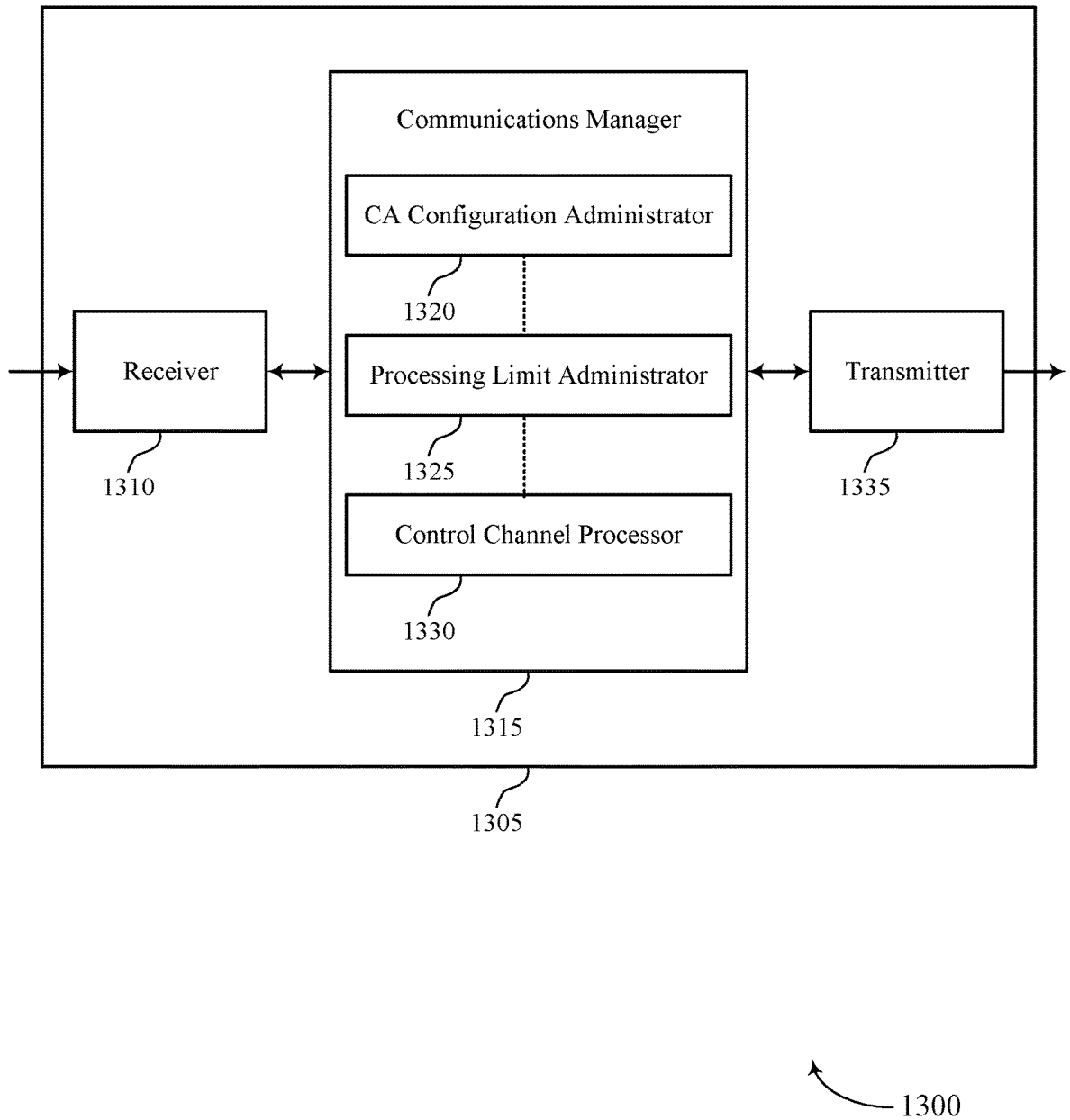

FIG. 13 shows a block diagram 1300 of a device 1305 that supports control channel processing limits for asynchronous cells in accordance with aspects of the present disclosure. The device 1305 may be an example of aspects of a device 1205, or a base station 105 as described herein. The device 1305 may include a receiver 1310, a communications manager 1315, and a transmitter 1335. The device 1305 may also include a processor. Each of these components may be in communication with one another (e.g., via one or more buses).

The receiver 1310 may receive information such as packets, user data, or control information associated with various information channels (e.g., control channels, data channels, and information related to control channel processing limits for asynchronous cells, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a CA configuration administrator 1320, a processing limit administrator 1325, and a control channel processor 1330. The communications manager 1315 may be an example of aspects of the communications manager 1510 described herein.

The CA configuration administrator 1320 may transmit, to a UE, a carrier aggregation (CA) configuration including a set of component carriers (CCs) configured for communication with the UE.

The processing limit administrator 1325 may identify a control channel processing limit for each CC of the set of CCs of the CA configuration based on one or more synchronization groups from the set of CCs, one or more numerology groups from the set of CCs, and a capability of the UE associated with a number of CCs the UE supports for control channel decoding for CA.

The control channel processor 1330 may transmit one or more control channels associated with the set of CCs in accordance with the control channel processing limit for each CC of the set of CCs. The control channel processor 1330 may establish a control channel configuration for the UE for a set of slots based on comparing a combined value for a control channel processing parameter for the one or more synchronization groups of each of the one or more numerology groups across the set of slots to the respective control channel processing limit of the each of the one or more numerology groups.

The transmitter 1335 may transmit signals generated by other components of the device 1305. In some examples, the transmitter 1335 may be collocated with a receiver 1310 in a transceiver module. For example, the transmitter 1335 may be an example of aspects of the transceiver 1520 described with reference to FIG. 15. The transmitter 1335 may utilize a single antenna or a set of antennas.

Figure 14:
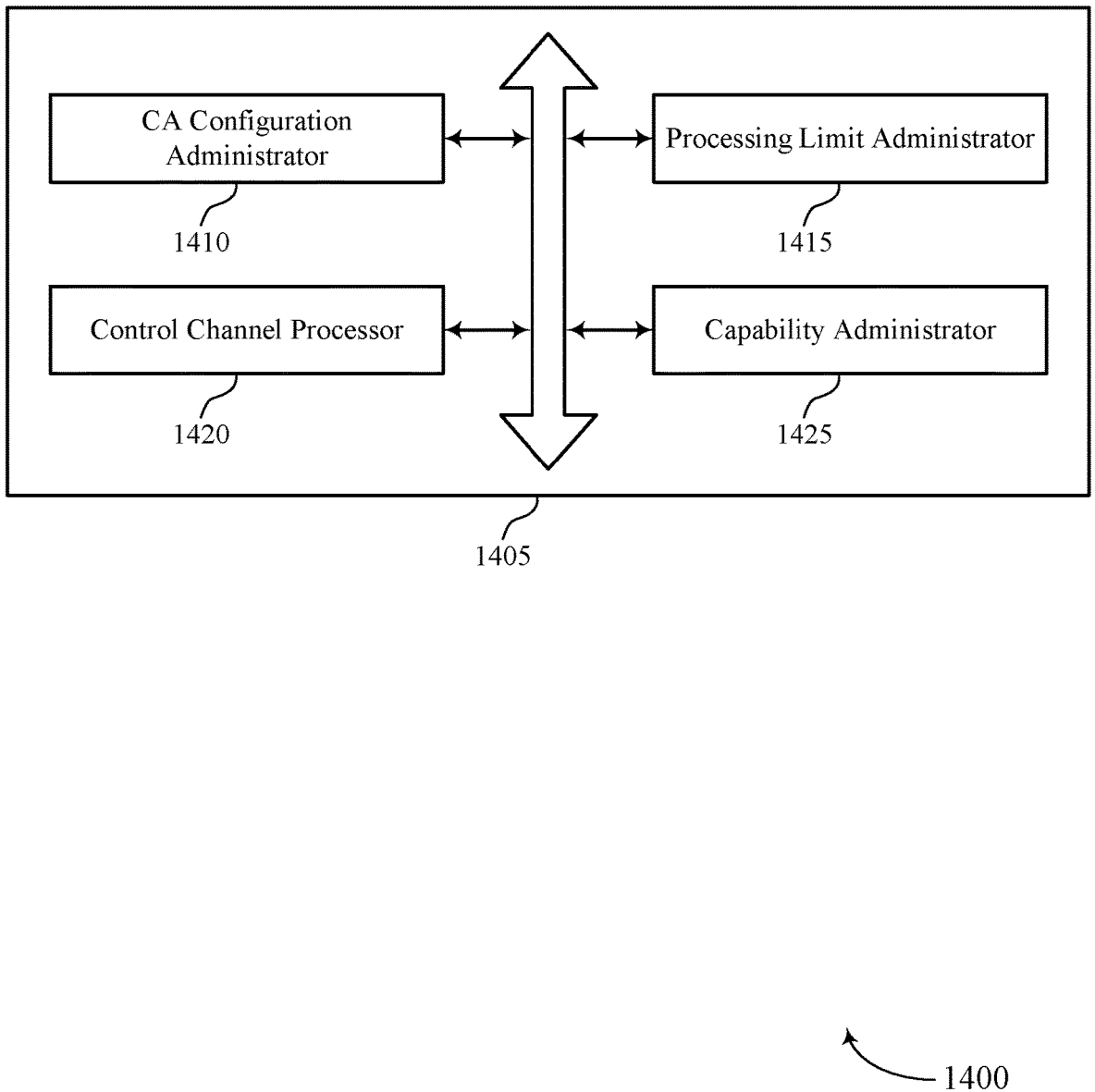
FIG. 14 shows a block diagram of a communications manager that supports control channel processing for asynchronous cells in accordance with aspects of the present disclosure.

FIG. 14 shows a block diagram 1400 of a communications manager 1405 that supports control channel processing limits for asynchronous cells in accordance with aspects of the present disclosure. The communications manager 1405 may be an example of aspects of a communications manager 1215, a communications manager 1315, or a communications manager 1510 described herein. The communications manager 1405 may include a CA configuration administrator 1410, a processing limit administrator 1415, a control channel processor 1420, and a capability administrator 1425. Each of these modules may communicate, directly or indirectly, with one another (e.g., via one or more buses).

The CA configuration administrator 1410 may transmit, to a UE, a carrier aggregation (CA) configuration including a set of component carriers (CCs) configured for communication with the UE. In some examples, the CA configuration administrator 1410 may modify the CA configuration or the control channel configuration in accordance with the respective control channel processing limit. In some examples, the CA configuration administrator 1410 may transmit the modified CA configuration or the modified control channel configuration to the UE.

The processing limit administrator 1415 may identify a control channel processing limit for each CC of the set of CCs of the CA configuration based on one or more synchronization groups from the set of CCs, one or more numerology groups from the set of CCs, and a capability of the UE associated with a number of CCs the UE supports for control channel decoding for CA, where CCs associated with each of the one or more synchronization groups are synchronous with each other, and where CCs associated with each of the one or more numerology groups share a same numerology with each other.

In some examples, the processing limit administrator 1415 may determine that the combined value for the control channel processing parameter for a numerology group of the one or more numerology groups exceeds the respective control channel processing limit. In some examples, the processing limit administrator 1415 may determine the combined value for the control channel processing parameter for each of the one or more numerology groups based on summing a largest value of the control channel processing parameter across the set of slots for each of the one or more synchronization groups of the each of the one or more numerology groups.

In some examples, the processing limit administrator 1415 may determine the combined value for a numerology group including a primary cell for each slot of the set of slots by summing a value for the control channel processing parameter for the primary cell for the each slot with a largest value of the control channel processing parameter across the set of slots for each of the one or more synchronization groups of the numerology group. In some examples, the processing limit administrator 1415 may determine the combined value for the control channel processing parameter for each of the one or more numerology groups based on summing a largest number for the control channel processing parameter for each CC of the each of the one or more numerology groups across the set of slots.

In some examples, the processing limit administrator 1415 may determine the combined value for a numerology group including a primary cell for each slot of the set of slots by summing a value for the control channel processing parameter for the primary cell for the each slot with a largest number for the control channel processing parameter for other CCs of the each of the one or more numerology groups across the set of slots. In some examples, the processing limit administrator 1415 may determine the combined value for the control channel processing parameter for each of the one or more numerology groups based on summing, for each slot of the set of slots, a value for the control channel processing parameter for a reference synchronization group of the each of the one or more numerology groups with a largest value of the control channel processing parameter for each other of the one or more synchronization groups of the each of the one or more numerology groups within a range of slots of the each slot.

The control channel processor 1415 may monitor one or more control channels associated with the set of CCs according to the determined control channel processing limit for each CC of the set of CCs. In some examples, the control channel processor 1415 may establish a control channel configuration for the UE for a set of slots based on comparing a combined value for a control channel processing parameter for the one or more synchronization groups of each of the one or more numerology groups across the set of slots to the respective control channel processing limit of the each of the one or more numerology groups.

The control channel processor 1420 may transmit one or more control channels associated with the set of CCs in accordance with the control channel processing limit for each CC of the set of CCs.

The capability administrator 1425 may allocate respective portions of the capability to each synchronization group of the one or more synchronization groups.

Figure 15:
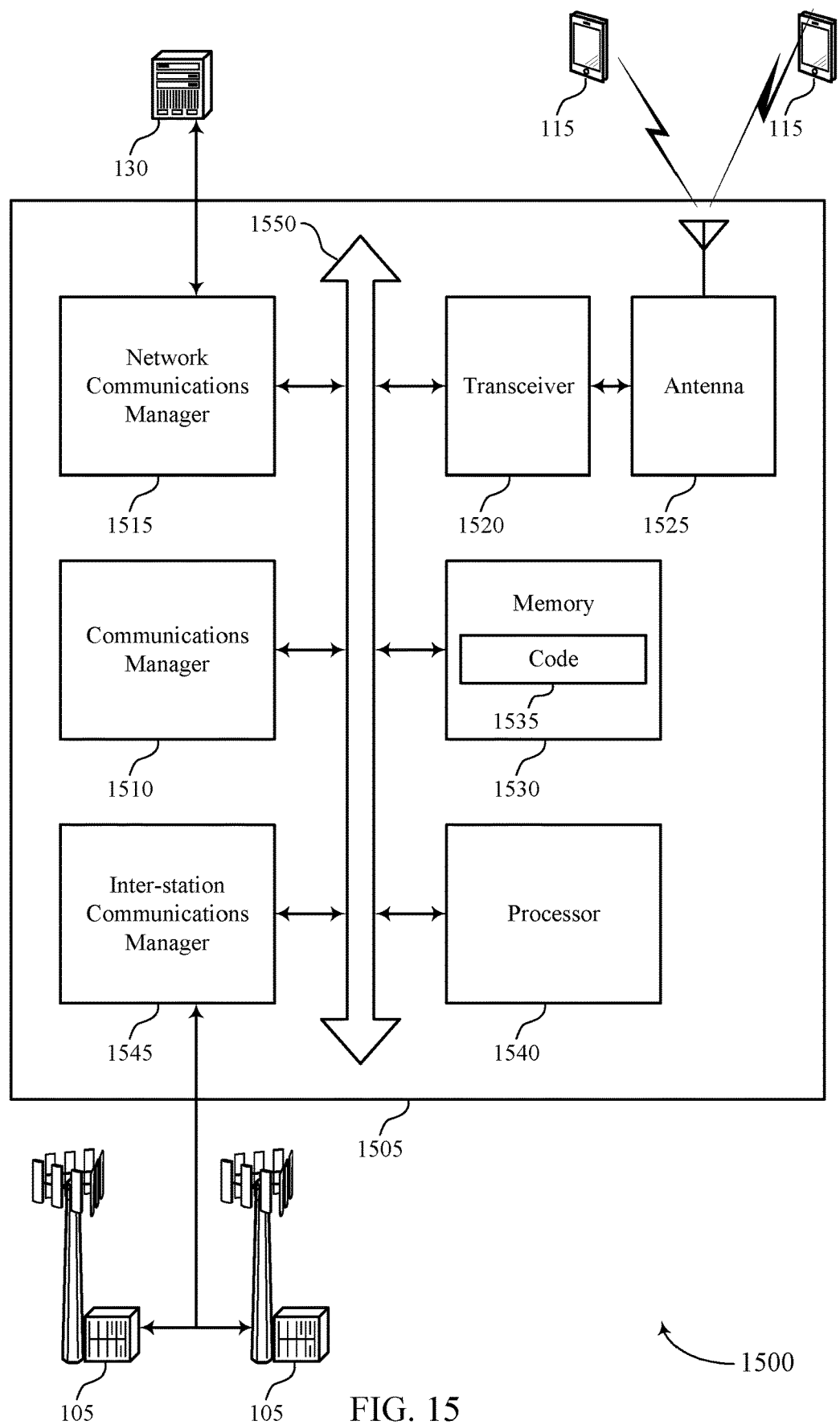
FIG. 15 shows a diagram of a system including a device that supports control channel processing for asynchronous cells in accordance with aspects of the present disclosure.

FIG. 15 shows a diagram of a system 1500 including a device 1505 that supports control channel processing limits for asynchronous cells in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may transmit, to a UE, a carrier aggregation (CA) configuration including a set of component carriers (CCs) configured for communication with the UE, identify a control channel processing limit for each CC of the set of CCs of the CA configuration based on one or more synchronization groups from the set of CCs, one or more numerology groups from the set of CCs, and a capability of the UE associated with a number of CCs the UE supports for control channel decoding for CA, and transmit one or more control channels associated with the set of CCs in accordance with the control channel processing limit for each CC of the set of CCs. The communications manager 1510 may also identify a carrier aggregation (CA) configuration including a set of component carriers (CCs) configured for communication with a UE, identify one or more numerology groups from the set of CCs, identify one or more synchronization groups for each of the one or more numerology groups, determine a control channel processing limit for the one or more numerology groups based on a capability of the UE associated with a number of CCs the UE supports for control channel decoding for CA, and establish a control channel configuration for the UE for a set of slots based on comparing a combined value for a control channel processing parameter for the one or more synchronization groups of each of the one or more numerology groups across the set of slots to the respective control channel processing limit of the each of the one or more numerology groups.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting control channel processing limits for asynchronous cells).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
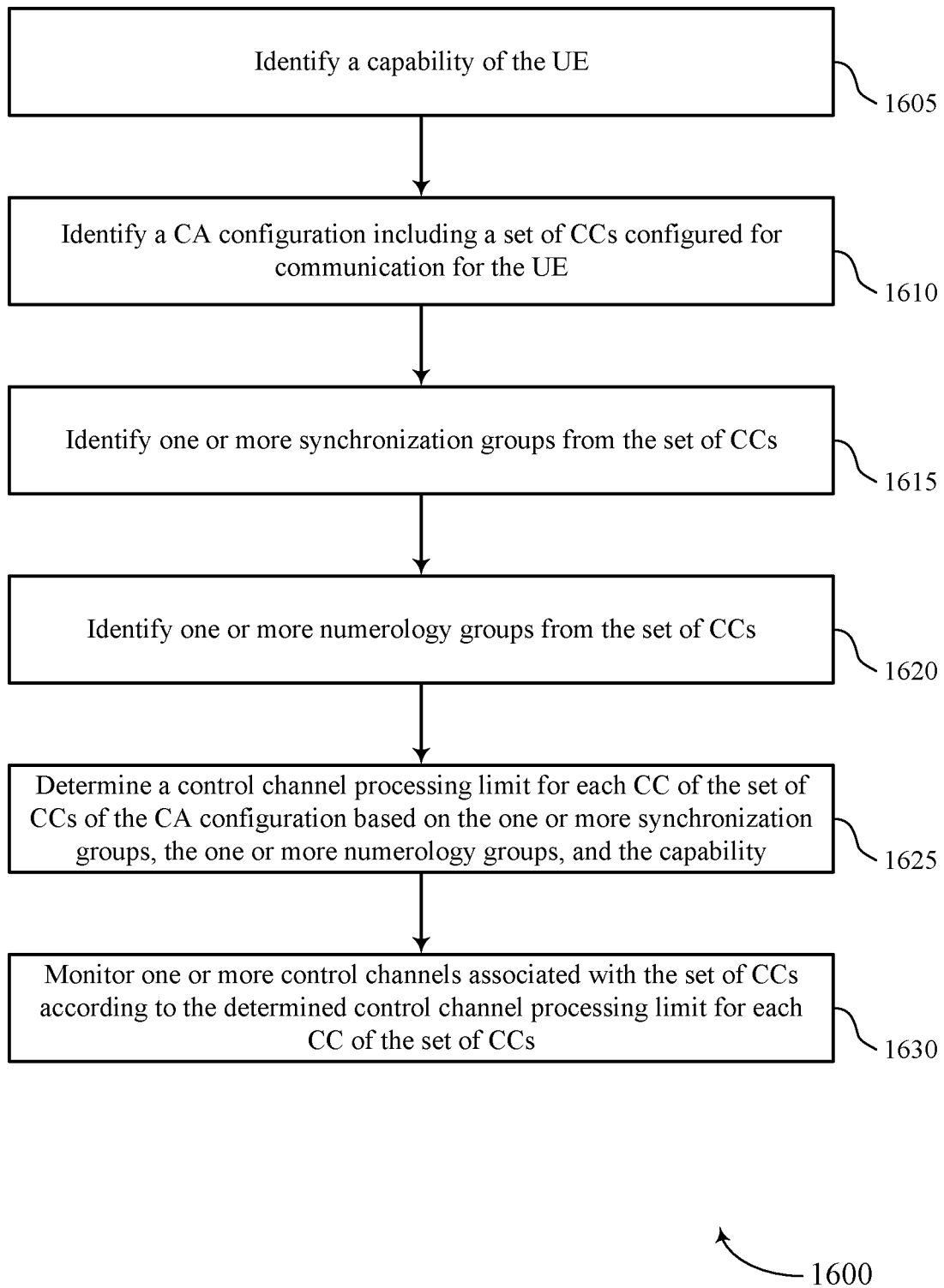
FIGS. 16 and 17 show flowcharts illustrating methods that support control channel processing for asynchronous cells in accordance with aspects of the present disclosure.

FIG. 16 shows a flowchart illustrating a method 1600 that supports control channel processing limits for asynchronous cells in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may identify a capability of the UE associated with a number of CCs the UE supports for control channel decoding for CA. The operations of 1605 may be performed according to the methods described herein. In some examples, aspects of the operations of 1605 may be performed by a capability administrator as described with reference to FIGS. 8 through 11.

At 1610, the UE may identify a CA configuration including a set of CCs configured for communication for the UE. The operations of 1610 may be performed according to the methods described herein. In some examples, aspects of the operations of 1610 may be performed by a CA configuration administrator as described with reference to FIGS. 8 through 11.

At 1615, the UE may identify one or more synchronization groups from the set of CCs, where CCs associated with each of the one or more synchronization groups are synchronous with each other. The operations of 1615 may be performed according to the methods described herein. In some examples, aspects of the operations of 1615 may be performed by a group administrator as described with reference to FIGS. 8 through 11.

At 1620, the UE may identify one or more numerology groups from the set of CCs, where CCs associated with each of the one or more numerology groups share a same numerology with each other. The operations of 1620 may be performed according to the methods described herein. In some examples, aspects of the operations of 1620 may be performed by a group administrator as described with reference to FIGS. 8 through 11.

At 1625, the UE may determine a control channel processing limit for each CC of the set of CCs of the CA configuration based on the one or more synchronization groups, the one or more numerology groups, and the capability. In determining the control channel processing limit for each CC, the UE may allocate portions of the capability to each of the synchronization groups. For example, the capability may be allocated in a number of ways including based on a proportion of a number of downlink CCs of each synchronization group to a total number of downlink CCs of the CA configuration, equally between each synchronization group and based on respective weighting factors for each synchronization group. In other examples, the UE may distribute respective portions of the capability among numerology groups within each of the one or more synchronization groups based at least in part on respective numbers of downlink CCs of the one or more numerology groups within each of the one or more synchronization groups. The operations of 1625 may be performed according to the methods described herein. In some examples, aspects of the operations of 1625 may be performed by a processing limit administrator as described with reference to FIGS. 8 through 11.

At 1630, the UE may monitor one or more control channels associated with the set of CCs according to the determined control channel processing limit for each CC of the set of CCs. The operations of 1630 may be performed according to the methods described herein. In some examples, aspects of the operations of 1630 may be performed by a control channel processor as described with reference to FIGS. 8 through 11.

Figure 17:
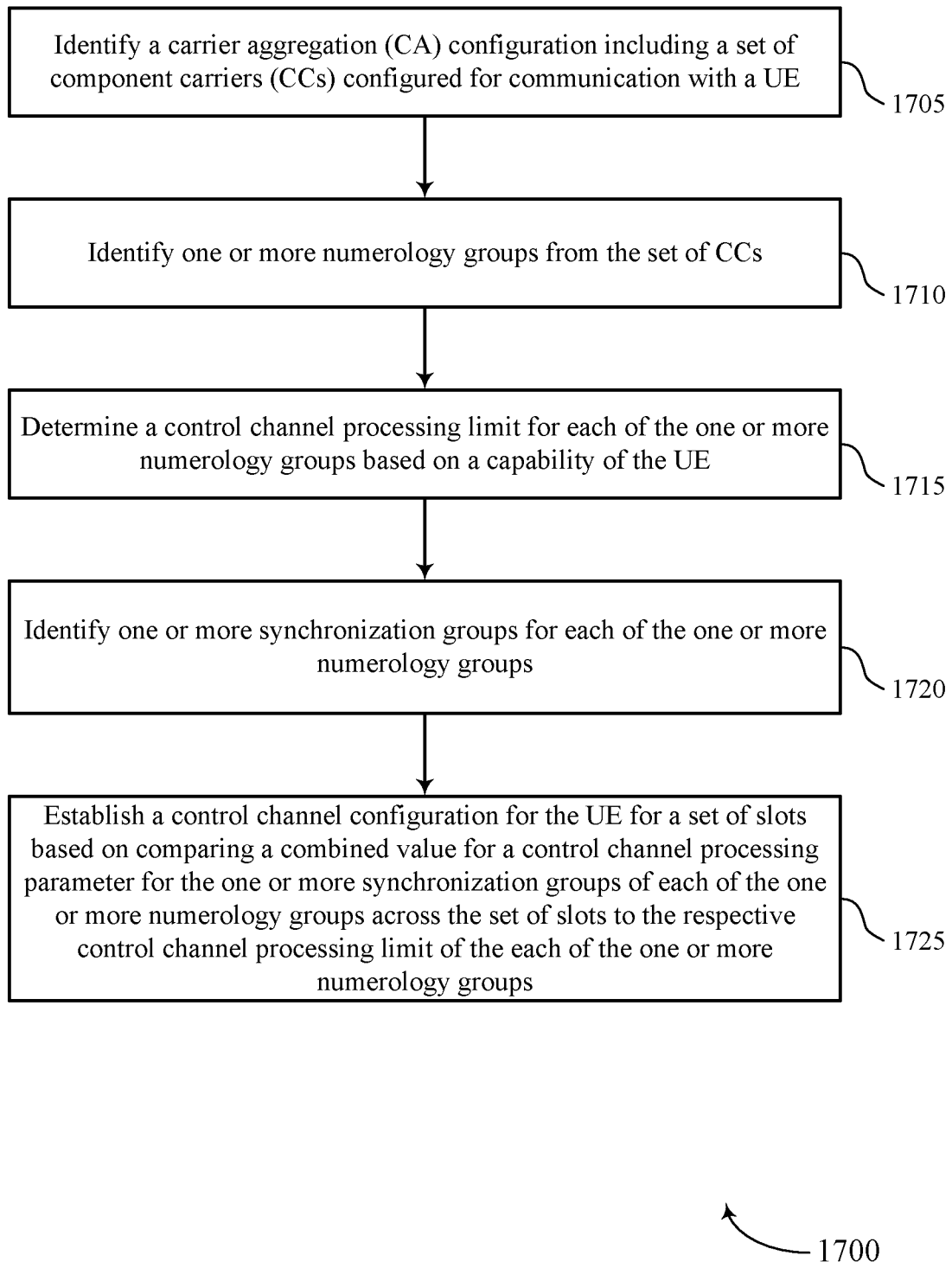

FIG. 17 shows a flowchart illustrating a method 1700 that supports control channel processing limits for asynchronous cells in accordance with aspects of the present disclosure. The operations of method 1700 may be implemented by a base station 105 or its components as described herein. For example, the operations of method 1700 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1705, the base station may identify a CA configuration including a set of CCs configured for communication with a UE. The operations of 1705 may be performed according to the methods described herein. In some examples, aspects of the operations of 1705 may be performed by a CA configuration administrator as described with reference to FIGS. 12 through 15.

At 1710, the base station may identify one or more numerology groups from the set of CCs. The operations of 1710 may be performed according to the methods described herein. In some examples, aspects of the operations of 1710 may be performed by a group administrator as described with reference to FIGS. 12 through 15.

At 1715, the base station may determine a control channel processing limit for each of the one or more numerology groups based on a capability of the UE associated with a number of CCs the UE supports for control channel decoding for CA. The operations of 1715 may be performed according to the methods described herein. In some examples, aspects of the operations of 1715 may be performed by a processing limit administrator as described with reference to FIGS. 12 through 15.

At 1720, the base station may identify one or more synchronization groups for each of the one or more numerology groups. The operations of 1720 may be performed according to the methods described herein. In some examples, aspects of the operations of 1720 may be performed by a group administrator as described with reference to FIGS. 12 through 15.

At 1725, the base station may establish a control channel configuration for the UE for a set of slots based on comparing a combined value for a control channel processing parameter for the one or more synchronization groups of each of the one or more numerology groups across the set of slots to the respective control channel processing limit of the each of the one or more numerology groups. In some examples, the base station may determine the combined value for the control channel processing parameter for each of the one or more numerology groups based at least in part on summing a largest value of the control channel processing parameter across the plurality of slots for each of the one or more synchronization groups of the each of the one or more numerology groups.

In some examples, the base station may determine the combined value for the control channel processing parameter for each of the one or more numerology groups based at least in part on summing a largest number for the control channel processing parameter for each CC of the each of the one or more numerology groups across the plurality of slots. In other examples, the base station may determine the combined value for a numerology group including a primary cell for each slot of the plurality of slots by summing a value for the control channel processing parameter for the primary cell for the each slot with a largest number for the control channel processing parameter for other CCs of the each of the one or more numerology groups across the plurality of slots.

In some examples, the base station may determine the combined value for the control channel processing parameter for each of the one or more numerology groups based at least in part on summing, for each slot of the plurality of slots, a value for the control channel processing parameter for a reference synchronization group of the each of the one or more numerology groups with a largest value of the control channel processing parameter for each other of the one or more synchronization groups of the each of the one or more numerology groups within a range of slots of the each slot. The operations of 1725 may be performed according to the methods described herein. In some examples, aspects of the operations of 1725 may be performed by a control channel processor as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    identifying a capability of the UE associated with a number of component carriers (CCs) the UE supports for control channel decoding for carrier aggregation (CA);
    identifying a CA configuration comprising a set of CCs configured for communication for the UE;
    identifying one or more synchronization groups from the set of CCs, wherein CCs associated with each of the one or more synchronization groups are synchronous with each other;
    identifying one or more numerology groups from the set of CCs, wherein CCs associated with each of the one or more numerology groups share a same numerology with each other;
    determining a control channel processing limit for each CC of the set of CCs of the CA configuration based at least in part on the one or more synchronization groups, the one or more numerology groups, and the capability; and
    monitoring one or more control channels associated with the set of CCs according to the determined control channel processing limit for each CC of the set of CCs.

2. The method of claim 1, wherein determining the control channel processing limit for each CC comprises:
    allocating respective portions of the capability to each synchronization group of the one or more synchronization groups.

3. The method of claim 2, wherein the respective portions of the capability for each synchronization group are allocated based at least in part on a proportion of a number of downlink CCs of each synchronization group to a total number of downlink CCs of the CA configuration.

4. The method of claim 2, wherein the respective portions of the capability are allocated equally between each synchronization group.

5. The method of claim 2, wherein the respective portions of the capability are allocated based at least in part on respective weighting factors for each synchronization group.

6. The method of claim 2, wherein allocating respective portions of the capability to each synchronization group of the one or more synchronization groups comprises:
    allocating a portion of the capability to a synchronization group containing a primary cell or a primary secondary cell; and
    allocating a remaining portion of the capability to the one or more synchronization groups.

7. The method of claim 2, wherein determining the control channel processing limit for each CC further comprises:
    distributing the respective portions of the capability among numerology groups within each of the one or more synchronization groups based at least in part on respective numbers of downlink CCs of the one or more numerology groups within each of the one or more synchronization groups.

8. The method of claim 1, wherein determining the control channel processing limit for each CC comprises:
allocating respective portions of the capability to each numerology group of the one or more numerology groups.

9. The method of claim 8, wherein determining the control channel processing limit for each CC further comprises:
distributing the respective portions of the capability among synchronization groups within each of the one or more numerology groups based at least in part on respective numbers of downlink CCs of the one or more synchronization groups within each of the one or more numerology groups.

10. The method of claim 1, wherein the control channel processing limit comprises a maximum number of blind decodes or control channel elements processed by the UE per slot.

11. The method of claim 1, wherein each of the one or more synchronization groups corresponds to one of a plurality of uplink control channel groups.

12. The method of claim 1, wherein the set of CCs comprises a first CC that is scheduled by a second CC that is asynchronous to the first CC, and wherein the first CC is included in a synchronization group associated with the second CC.

13. A method for wireless communication at a base station, comprising:
transmitting, to a user equipment (UE), a carrier aggregation (CA) configuration comprising a set of component carriers (CCs) configured for communication with the UE;
identifying a control channel processing limit for each CC of the set of CCs of the CA configuration based at least in part on one or more synchronization groups from the set of CCs, one or more numerology groups from the set of CCs, and a capability of the UE associated with a number of CCs the UE supports for control channel decoding for CA, wherein CCs associated with each of the one or more synchronization groups are synchronous with each other, and wherein CCs associated with each of the one or more numerology groups share a same numerology with each other; and
transmitting one or more control channels associated with the set of CCs in accordance with the control channel processing limit for each CC of the set of CCs.

14. The method of claim 13, wherein identifying the control channel processing limit for each CC comprises:
allocating respective portions of the capability to each synchronization group of the one or more synchronization groups.

15. The method of claim 14, wherein the respective portions of the capability for each synchronization group are allocated based at least in part on a proportion of a number of downlink CCs of each synchronization group to a total number of downlink CCs of the CA configuration.

16. The method of claim 14, wherein the respective portions of the capability are allocated equally between synchronization group.

17. The method of claim 14, wherein the respective portions of the capability are allocated based at least in part on respective weighting factors for each synchronization group.

18. The method of claim 14, wherein a portion of the capability is allocated to a synchronization group containing a primary cell or a primary secondary cell, and wherein a remaining portion of the capability is allocated to the one or more synchronization groups.

19. The method of claim 14, wherein the respective portions of the capability are distributed among numerology groups within each of the one or more synchronization groups based at least in part on respective numbers of downlink CCs of the one or more numerology groups within each of the one or more synchronization groups.

20. The method of claim 13, wherein each numerology group of the one or more numerology groups are allocated respective portions of the capability.

21. The method of claim 20, wherein the respective portions of the capability are distributed among synchronization groups within each of the one or more numerology groups based at least in part on respective numbers of downlink CCs of the one or more synchronization groups within each of the one or more numerology groups.

22. The method of claim 13, wherein the control channel processing limit comprises a maximum number of blind decodes or control channel elements processed by the UE per slot.

23. The method of claim 13, wherein each of the one or more synchronization groups corresponds to one of a plurality of uplink control channel groups.

24. The method of claim 13, wherein the set of CCs comprises a first CC that is scheduled by a second CC that is asynchronous to the first CC, and wherein the first CC and is included in a synchronization group associated with the second CC.

25. An apparatus for wireless communication at a user equipment (UE), comprising: a processor, memory coupled with the processor; and instructions stored in the memory and executable by the processor to cause the apparatus to:
identify a capability of the UE associated with a number of component carriers (CCs) the UE supports for control channel decoding for carrier aggregation (CA);
identify a CA configuration comprising a set of CCs configured for communication for the UE;
identify one or more synchronization groups from the set of CCs, wherein CCs associated with each of the one or more synchronization groups are synchronous with each other;
identify one or more numerology groups from the set of CCs, wherein CCs associated with each of the one or more numerology groups share a same numerology with each other;
determine a control channel processing limit for each CC of the set of CCs of the CA configuration based at least in part on the one or more synchronization groups, the one or more numerology groups, and the capability; and
monitor one or more control channels associated with the set of CCs according to the determined control channel processing limit for each CC of the set of CCs.

26. The apparatus of claim 25, wherein the instructions to determine the control channel processing limit for each CC are executable by the processor to cause the apparatus to:
allocate respective portions of the capability to each synchronization group of the one or more synchronization groups; and
distribute the respective portions of the capability among numerology groups within each of the one or more synchronization groups based at least in part on respective numbers of downlink CCs of the one or more numerology groups within each of the one or more synchronization groups.

27. The apparatus of claim 25, wherein the instructions to determine the control channel processing limit for each CC are executable by the processor to cause the apparatus to:
- allocate respective portions of the capability to each numerology group of the one or more numerology groups; and
- distribute the respective portions of the capability among synchronization groups within each of the one or more numerology groups based at least in part on respective numbers of downlink CCs of the one or more synchronization groups within each of the one or more numerology groups.

28. An apparatus for wireless communication at a base station, comprising: a processor, memory coupled with the processor; and instructions stored in the memory and executable by the processor to cause the apparatus to:
- transmit, to a user equipment (UE), a carrier aggregation (CA) configuration comprising a set of component carriers (CCs) configured for communication with the UE;
- identify a control channel processing limit for each CC of the set of CCs of the CA configuration based at least in part on one or more synchronization groups from the set of CCs, one or more numerology groups from the set of CCs, and a capability of the UE associated with a number of CCs the UE supports for control channel decoding for CA, wherein CCs associated with each of the one or more synchronization groups are synchronous with each other, and wherein CCs associated with each of the one or more numerology groups share a same numerology with each other; and
- transmit one or more control channels associated with the set of CCs in accordance with the control channel processing limit for each CC of the set of CCs.

29. The apparatus of claim 28, wherein the instructions to identify the control channel processing limit for each CC are executable by the processor to cause the apparatus to:
- allocate respective portions of the capability to each synchronization group of the one or more synchronization groups, wherein the respective portions of the capability are distributed among numerology groups within each of the one or more synchronization groups based at least in part on respective numbers of downlink CCs of the one or more numerology groups within each of the one or more synchronization groups.

30. The apparatus of claim 28, wherein each numerology group of the one or more numerology groups are allocated respective portions of the capability, wherein the respective portions of the capability are distributed among synchronization groups within each of the one or more numerology groups based at least in part on respective numbers of downlink CCs of the one or more synchronization groups within each of the one or more numerology groups.

* * * * *